(12) United States Patent
Noguchi et al.

(10) Patent No.: US 9,442,611 B2
(45) Date of Patent: Sep. 13, 2016

(54) DISPLAY DEVICE WITH TOUCH DETECTION FUNCTION AND ELECTRONIC APPARATUS INCLUDING SAME

(71) Applicant: Japan Display Inc., Tokyo (JP)

(72) Inventors: Koji Noguchi, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/100,969

(22) Filed: Dec. 9, 2013

(65) Prior Publication Data

US 2014/0168151 A1    Jun. 19, 2014

(30) Foreign Application Priority Data

Dec. 14, 2012  (JP) ................................ 2012-273990

(51) Int. Cl.
*G06F 3/045* (2006.01)
*G06F 3/044* (2006.01)
*G06F 3/041* (2006.01)

(52) U.S. Cl.
CPC ............. *G06F 3/044* (2013.01); *G06F 3/0412* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 2008/0158169 A1* | 7/2008 | O'Connor | G06F 3/0418 345/173 |
| 2010/0079401 A1 | 4/2010 | Staton | |
| 2012/0044195 A1* | 2/2012 | Nakanishi | G06F 3/0412 345/174 |
| 2012/0050217 A1 | 3/2012 | Noguchi et al. | |
| 2012/0056834 A1 | 3/2012 | Kim et al. | |
| 2012/0262390 A1* | 10/2012 | Kida | G06F 3/041 345/173 |
| 2012/0293429 A1 | 11/2012 | Chuang et al. | |
| 2013/0069894 A1* | 3/2013 | Chen | G06F 3/0412 345/173 |
| 2013/0082954 A1* | 4/2013 | Azumi | G06F 3/041 345/173 |

FOREIGN PATENT DOCUMENTS

| | | |
|---|---|---|
| CN | 102375637 | 3/2012 |
| CN | 102402331 | 4/2012 |
| JP | 2010-015262 | 1/2010 |

(Continued)

OTHER PUBLICATIONS

Office Action issued in connection with Taiwan Patent Application No. 102145971, dated Jul. 7, 2015. (11 pages).
Chinese Office Action issued Mar. 30, 2016 in corresponding Chinese Application No. 201310683572.X.

*Primary Examiner* — Joseph Haley
*Assistant Examiner* — Ifedayo Iluyomade
(74) *Attorney, Agent, or Firm* — K&L Gates LLP

(57) ABSTRACT

According to an aspect, a display device with a touch detection function includes: a pixel electrode; a touch detection electrode; a display drive unit for outputting the pixel signal to the pixel electrode in synchronization with a display drive signal; an operation drive unit for supplying the display drive signal in a display operation period to perform a display operation and supplying a touch detection drive signal in a touch detection period to perform a touch detection operation; a touch detection unit for detecting a detection signal outputted from the touch detection electrode; and a control unit for executing the display operation period and the touch detection period in a time divisional manner. The touch detection unit performs a noise detection operation for detecting a disturbance noise superimposed on the touch detection electrode in the display operation period.

11 Claims, 20 Drawing Sheets

(56) References Cited

FOREIGN PATENT DOCUMENTS

| JP | 2012-503831 | 2/2012 |
| TW | 201227476 | 7/2012 |
| TW | 201248461 | 12/2012 |

* cited by examiner

DISPLAY DEVICE WITH TOUCH DETECTION FUNCTION AND ELECTRONIC APPARATUS INCLUDING SAME

CROSS REFERENCES TO RELATED APPLICATIONS

The present application claims priority to Japanese Priority Patent Application JP 2012-273990 filed in the Japan Patent Office on Dec. 14, 2012, the entire content of which is hereby incorporated by reference.

BACKGROUND

1. Technical Field

The present disclosure relates to a display device with a touch detection function which enables an external proximity object to be detected based on a change in capacitance and to an electronic apparatus including the same.

2. Description of the Related Art

In recent years, attention has been focused on a display device with a touch detection function which has a touch detection device that is touch panel provided on a display device such as a liquid crystal display device or which has a touch panel and a display device integrated with each other. Various types of button images are displayed on the display device, thereby enabling the entry of information in place of typical mechanical buttons. The display device having such a touch panel requires no input device like the keyboard, mouse, or key pads, and thus has been extensively used, for example, with portable information device like mobile telephones as well as computers.

Although there exist several touch detection schemes such as the optical type and the resistive type, the mobile device, in particular, tends to employ a capacitive type which provides a relatively simple structure and requires low power consumption. The capacitive touch detection device is provided with capacitance between drive electrodes, to which a drive signal is applied, and touch detection electrodes so as to detect a change in capacitance caused by an external object being brought into contact with or proximity to the device, that is, a change in voltage waveform that appears on the touch detection electrodes, thereby determining whether or not there is a touch.

With the touch detection device, there is a possibility that noises resulting from disturbance (disturbance noises) may propagate to the touch detection electrodes to cause a malfunction of the touch panel in the touch detection operation. FIG. 35 is an explanatory view illustrating the relationship between the frequency of a touch detection drive signal and a disturbance noise. For example, with a drive signal of 250 [kHz] being applied to the drive electrodes, there is a possibility of causing a malfunction when the disturbance noise having a high level at around 250 [kHz] as illustrated in FIG. 35, that is, the disturbance noise having a disturbance noise peak 101 is propagated to the touch detection electrodes. More specifically, there may occur a malfunction of the touch detection operation, in the case of which a change in voltage waveform appearing on the touch detection electrodes due to the disturbance noise may be determined to be a change caused by an external object being brought into contact with or proximity to the device. That is, it may be possibly determined that the external object has been brought into contact with or proximity to the device even when no external object has been actually brought into contact with or proximity to the device.

In order to address this problem, for example, Japanese Patent Application Laid-open Publication No. 2010-015262 discloses a capacitive touch detection device which detects the level of a disturbance noise and avoids a frequency in the vicinity of the frequency of the disturbance noise, thereby preventing a malfunction of the touch detection operation resulting from the disturbance noise. For example, as illustrated in FIG. 35, the occurrence of malfunction is prevented by changing the frequency of the drive signal from 250 [kHz] to a selected drive frequency 102.

To control the touch detection operation depending on the component of disturbance noise, the component of the disturbance noise has to be detected. Japanese Translation of PCT Patent Application Laid-open Publication No. 2012-503831 suggests that there should be provided a noise measurement period for detecting a disturbance noise in addition to the touch detection period.

The display device with a touch detection function may be conceivably configured such that the noise measurement period for detecting a disturbance noise is set to a period other than the display operation period in which the liquid crystal display device performs a write operation to write an image and the touch detection period in which the touch detection device performs a touch detection operation to detect whether an external object has been brought into contact with or proximity to the touch panel. In this case, the display device with a touch detection function measures a disturbance noise in a noise measurement period and then based on the measurement result, determines the drive frequency of touch detections, and alternately executes the display operation period and the touch detection period a certain number of times. After executing the display operation period and the touch detection period a certain number of times, the display device with a touch detection function measures the disturbance noise in the noise measurement period.

When the display operation period, the touch detection period, and the noise measurement period are provided in a time divisional manner, there will be an increase in the length of time in which neither the display operation period nor the touch detection period is executed in one frame, thus causing a decrease in the time to be assigned to the display operation period and the touch detection period. A decrease in time of the display operation period and the touch detection period would make it difficult to improve the display performance and the touch detection performance.

For the foregoing reasons, there is a need for a display device with a touch detection function which can improve the display performance and the touch detection performance and an electronic apparatus which includes the same.

SUMMARY

According to an aspect, a display device with a touch detection function includes: a pixel electrode to which a pixel signal is applied to allow a display element to perform a display operation; a touch detection electrode for detecting whether an external object is in contact with or in proximity to the display device; a display drive unit for outputting the pixel signal to the pixel electrode in synchronization with a display drive signal so as to perform the display operation; an operation drive unit for supplying the display drive signal in a display operation period to perform the display operation and supplying a touch detection drive signal in a touch detection period to perform a touch detection operation; a touch detection unit for detecting a detection signal outputted from the touch detection electrode; and a control unit for executing the display operation period and the touch detection period in a time divisional manner. The touch detection unit performs a noise detection operation for detecting a disturbance noise superimposed on the touch detection electrode in the display operation period.

According to another aspect, an electronic apparatus includes: the display device with a touch detection function; and a controller for executing processing in response to a control operation detected by the display device with a touch detection function and supplying a video signal to the display device with a touch detection function.

Additional features and advantages are described herein, and will be apparent from the following Detailed Description and the figures.

DETAILED DESCRIPTION

Now, the modes (embodiments) for carrying out the present disclosure will be described in more detail with reference to the drawings. The present disclosure will not be limited by the contents of the embodiments to be described below. The components to be described below may include those that can be readily conceived by those skilled in the art or those that are substantially identical thereto. Furthermore, the components to be described below may be employed in combination as appropriate. The description will be made in the following order.

1. Embodiments (Display device with a touch detection function)
   1-1. First embodiment
   1-2. Second embodiment
   1-3. Modification
2. Application examples (Electronic apparatus)
Examples of electronic apparatus into which the display devices with a touch detection function according to the aforementioned embodiments are incorporated.
3. Aspects of the present disclosure

1. EMBODIMENTS

1-1. First Embodiment

1-1A. Example of Entire Configuration

Figure 1:
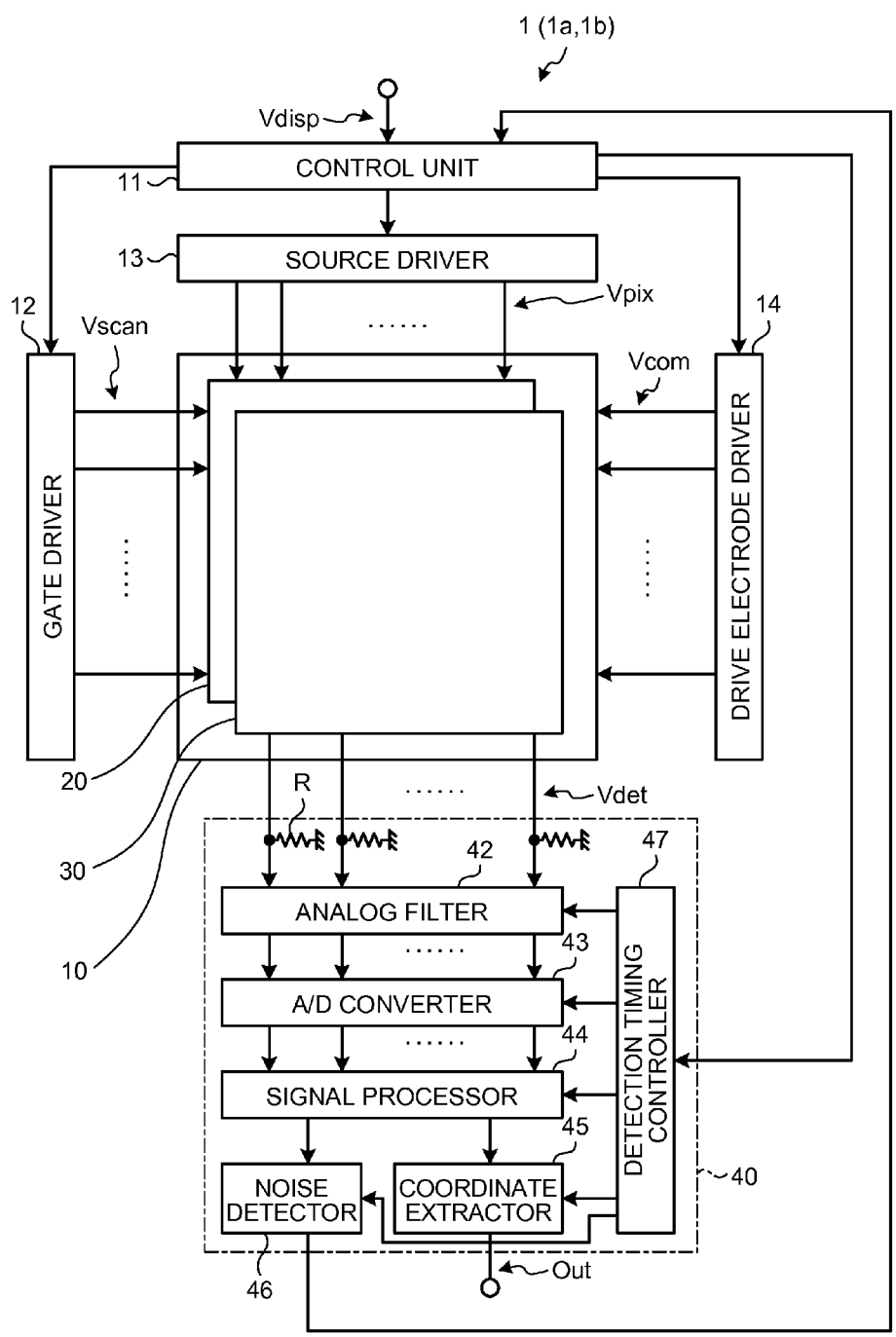
FIG. 1 is a block diagram illustrating an example of the configuration of a display device with a touch detection function according to a first embodiment.

FIG. 1 is a block diagram illustrating an example of the configuration of a display device with a touch detection function according to the first embodiment. Now, referring to FIG. 1, a description will be made to the entire configuration of the display device 1 with a touch detection function according to the embodiment. The display device 1 with a touch detection function illustrated in FIG. 1 employs liquid crystal display elements as display elements, and is a so-called in-cell type device in which a liquid crystal display device 20 including the liquid crystal display elements and a capacitive touch detection device 30 are integrated.

As illustrated in FIG. 1, the display device 1 with a touch detection function according to the embodiment includes a display unit 10 with a touch detection function, a control unit 11, a gate driver 12, a source driver 13, a drive electrode driver 14, and a touch detection unit 40.

The display unit 10 with a touch detection function is equipped with a touch detection function. The display unit 10 with a touch detection function has the liquid crystal display device 20 and the touch detection device 30. As will be discussed later, the liquid crystal display device 20 displays by sequentially scanning horizontal lines one by one in response to a scanning signal Vscan supplied from the gate driver 12. The basic principle of the touch detection operation of the touch detection device 30 will be described later.

The control unit 11 outputs a control signal to each of the gate driver 12, the source driver 13, the drive electrode driver 14, and the touch detection unit 40 in response to a video signal Vdisp supplied from outside to thereby provide control so that these components operate in synchronization with each other.

In response to the control signal outputted from the control unit 11, the gate driver 12 functions to sequentially select one horizontal line to be displayed by the liquid crystal display device 20 of the display unit 10 with a touch detection function. More specifically, the gate driver 12 applies the scanning signal Vscan through a scanning signal line GCL to the gate of a TFT element Tr of pixels Pix, thereby sequentially selecting one row (one horizontal line) of the pixels Pix to be displayed, among the pixels Pix being formed in matrix on the liquid crystal display device 20 of the display unit 10 with a touch detection function.

The source driver 13 outputs a pixel signal Vpix to each of the pixels Pix of the liquid crystal display device 20 of the display unit 10 with a touch detection function in response to the control signal outputted from the control unit 11. More specifically, the source driver 13 outputs the pixel signal Vpix through a pixel signal line SGL to each of the pixels Pix which constitute one horizontal line sequentially selected by the gate driver 12. Then, each of the pixels Pix constituting one horizontal line performs display operation by receiving the pixel signal Vpix.

The drive electrode driver 14 outputs a drive signal Vcom to drive electrodes COML (to be discussed later) of the display unit 10 with a touch detection function in response to the control signal outputted from the control unit 11.

1-1B. Basic Principle of Capacitive Touch Detection

Figure 2:
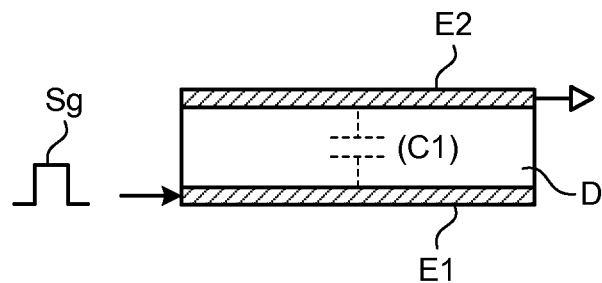
FIG. 2 is an explanatory view illustrating the basic principle of a capacitive touch detection scheme with a finger not in contact with nor in proximity to the device.
Figure 3:
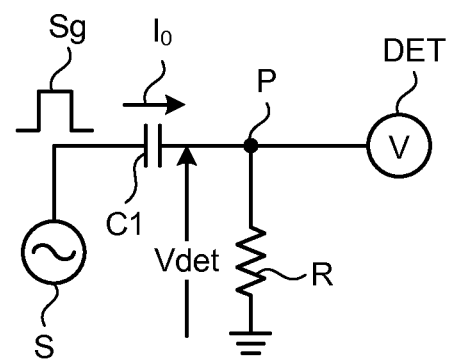
FIG. 3 is an explanatory view illustrating an example of an equivalent circuit corresponding to the state illustrated in FIG. 2 with a finger not in contact with nor in proximity to the device.
Figure 4:
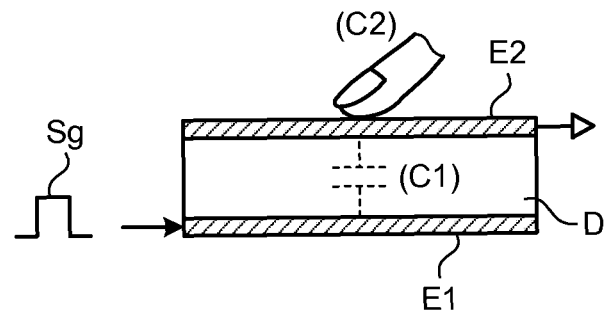
FIG. 4 is an explanatory view illustrating the basic principle of a capacitive touch detection scheme with a finger in contact with or in proximity to the device.
Figure 5:
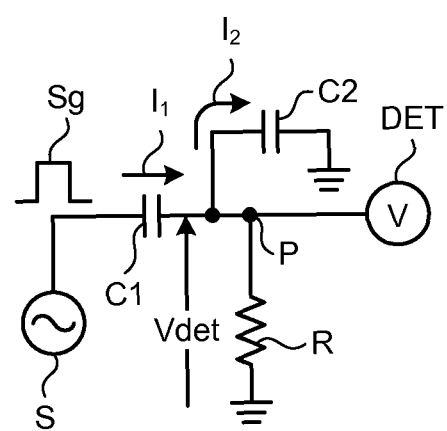
FIG. 5 is an explanatory view illustrating an example of an equivalent circuit corresponding to the state illustrated in FIG. 4 with a finger in contact with or in proximity to the device.

The touch detection device 30 operates on the basic principle of capacitive touch detection and outputs a detection signal Vdet. Referring to FIGS. 2 to 6, a description will be made to the basic principle of touch detection in the display device with a touch detection function of the embodiment. FIG. 2 is an explanatory view illustrating the basic principle of the capacitive touch detection scheme with a finger not in contact with nor in proximity to the device. FIG. 3 is an explanatory view illustrating an example of an equivalent circuit corresponding to the state illustrated in FIG. 2 with a finger not in contact with nor in proximity to the device. FIG. 4 is an explanatory view illustrating the basic principle of the capacitive touch detection scheme with a finger in contact with or in proximity to the device. FIG. 5 is an explanatory view illustrating an example of an equivalent circuit corresponding to the state illustrated in FIG. 4 with a finger in contact with or in proximity to the device.

For example, as illustrated in FIGS. 2 and 4, a capacitive element C1 includes a pair of electrodes, a drive electrode E1 and a touch detection electrode E2, which are disposed to face to each other with a dielectric D therebetween. As illustrated in FIGS. 3 and 5, the capacitive element C1 has one end coupled to an AC signal source (drive signal source) S and the other end P grounded through a resistor R and coupled to a voltage detector (touch detection unit) DET.

When an AC square wave Sg at a predetermined frequency (for example, about several kHz to several hundred kHz) is applied from the AC signal source S to the drive electrode E1 (one end of the capacitive element C1), there appears an output waveform (the detection signal Vdet) on the touch detection electrode E2 (the other end P of the capacitive element C1). The AC square wave Sg is equivalent to a touch detection drive signal Vcomt, to be discussed later.

Figure 6:
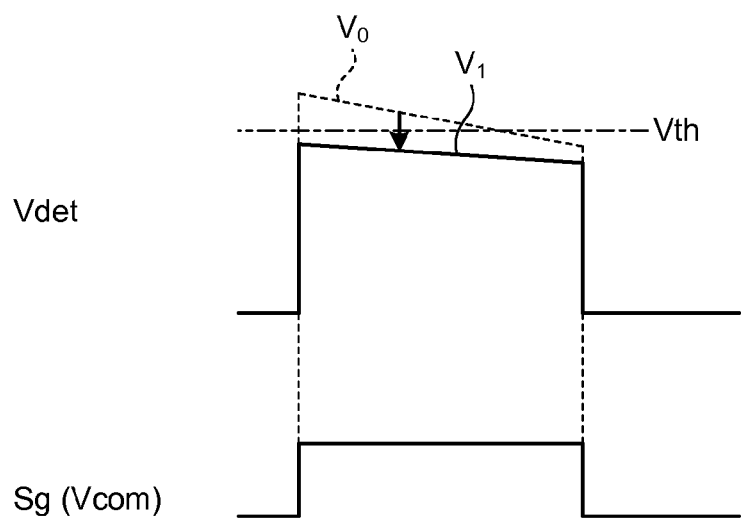
FIG. 6 is a view illustrating an example of the waveforms of a drive signal and a touch detection signal.

With a finger not in contact with (nor in proximity to) the device (in a non-contact state) as illustrated in FIGS. 2 and 3, a current $I_0$ flows depending on the capacitance value of the capacitive element C1 as the capacitive element C1 is charged or discharged. The potential waveform at this time at the other end P of the capacitive element C1 is, for example, a waveform $V_0$ as illustrated in FIG. 6, so that the voltage detector DET illustrated in FIG. 3 detects the waveform $V_0$.

On the one hand, with a finger in contact with (or in proximity to) the device (in a contact state) as illustrated in FIG. 4, the capacitance formed by the finger acts as a capacitive element C2 to be added to the capacitive element C1. Thus, in the equivalent circuit illustrated in FIG. 5, the capacitive element C2 is formed to be added to the capacitive element C1 in series. In this state, as the capacitive elements C1 and C2 are charged or discharged, currents $I_1$ and $I_2$ flow into the capacitive elements C1 and C2. The potential waveform at this time at the other end P of the capacitive element C1 is, for example, a waveform $V_1$ of FIG. 6, so that the voltage detector DET detects the waveform $V_1$. At this time, the potential at the other end P is a divided potential determined by the values of the currents $I_1$ and $I_2$ flowing through the capacitive elements C1 and C2. Accordingly, the waveform $V_1$ takes on values less than those of the waveform $V_0$ in a non-contact state. The voltage detector DET compares the detected voltage with a predetermined threshold voltage Vth, and determines that the finger is in a non-contact state if the detected voltage is equal to or greater than the threshold voltage Vth, whereas determining that the finger is in a contact state if the detected voltage is less than the threshold voltage Vth. In this manner, it is possible to detect a touch.

The touch detection device 30 illustrated in FIG. 1 is configured to sequentially scan detection blocks one by one for touch detection in response to the drive signal Vcom (the touch detection drive signal Vcomt to be discussed later) supplied from the drive electrode driver 14.

The touch detection device 30 is configured to output the detection signal Vdet for each detection block from a plurality of touch detection electrodes TDL, to be discussed later, and supply the signal to the touch detection unit 40.

In response to the control signal outputted from the control unit 11 and the detection signal Vdet outputted from the touch detection electrodes TDL of the touch detection device 30, the touch detection unit 40 detects whether or not there is a touch on the touch detection device 30 in a touch detection period and, if the touch has been detected, determines the coordinates of the touch in a touch detection region. In a noise detection period, the touch detection unit 40 also removes an LCD noise (to be discussed later) that occurs in the display operation of the liquid crystal display device 20 from the detection signal Vdet supplied from the touch detection electrodes TDL of the touch detection device 30, thereby extracting a frequency component of those of a disturbance noise having a frequency equivalent to the frequency of the touch detection drive signal Vcomt. The touch detection unit 40 includes an analog filter 42, an A/D converter 43, a signal processor 44, a coordinate extractor 45, a noise detector 46, and a detection timing controller 47.

The analog filter 42 is a filter which extracts the frequency component of the touch detection drive signal Vcomt from the detection signal Vdet. This allows the analog filter 42 to serve in a touch detection period as a low-pass analog filter which removes the high-frequency components (noise components) included in the detection signal Vdet outputted from the touch detection electrodes TDL of the touch detection device 30 and extracts each touch component for output. The analog filter 42 also serves in a noise detection period as a filter which removes the LCD noise (to be discussed later) that occurs in the display operation of the liquid crystal display device 20 from the detection signal Vdet supplied from the touch detection electrodes TDL of the touch detection device 30, and passes therethrough only a frequency component of those of a disturbance noise having a frequency equivalent to the frequency of the touch detection drive signal Vcomt. The resistor R is coupled between each input terminal of the analog filter 42 and the ground so as to provide a DC potential (0 V). The analog filter to be employed can be any type of filters such as a bandpass filter, a low-pass filter, or a high-pass filter, or a combination of these filters.

The A/D converter 43 samples, with appropriate timing, analog signals outputted from the analog filter 42 and converts the resulting signals into digital signals. For example, the A/D converter 43 may sample and convert analog signals outputted from the analog filter 42 into digital signals in a touch detection period with timing in synchronization with the touch detection drive signal Vcomt or at a sampling frequency higher than the frequency of the timing. The touch detection unit 40 is configured such that the analog signal is converted into the digital signal in the A/D converter 43 after having passed through the analog filter 42. However, the embodiment is not limited thereto. The touch detection unit 40 may also perform filtering as digital processing after the A/D conversion. In this case, the filter to be employed is a digital filter. The digital filter should be one that has the same performance as that for the analog processing, such as the digital low-pass filter (LPF), the digital band-pass filter (BPF), or the digital high-pass filter (HPF).

The signal processor 44 is a logic circuit for detecting in response to an output signal from the A/D converter 43 whether or not there is a touch on the touch detection device 30 in a touch detection period. The signal processor 44 is also a logic circuit for detecting in a noise detection period whether or not there is a frequency component of those of a disturbance noise having a frequency equivalent to the frequency of the touch detection drive signal Vcomt.

The coordinate extractor 45 is a logic circuit for determining the coordinates of a touch on the touch detection device 30 when the touch is detected by the signal processor 44 in a touch detection period and then outputting the coordinate data as an output signal Out. The noise detector 46 outputs a noise notice signal for the touch detection signal to the control unit 11 when the output signal from the signal processor 44 contains noise. The detection timing controller 47 provides control so that each circuit constituting the touch detection unit 40 operates in synchronization with each other.

The source driver 13 is equivalent to the "display drive unit" of the present disclosure; and the drive electrode driver 14 is equivalent to the "operation drive unit" of the present disclosure.

1-1C. the Display Unit 10 with a Touch Detection Function

Now, an example of the configuration of the display unit 10 with a touch detection function will be described in detail below.

Figure 7:
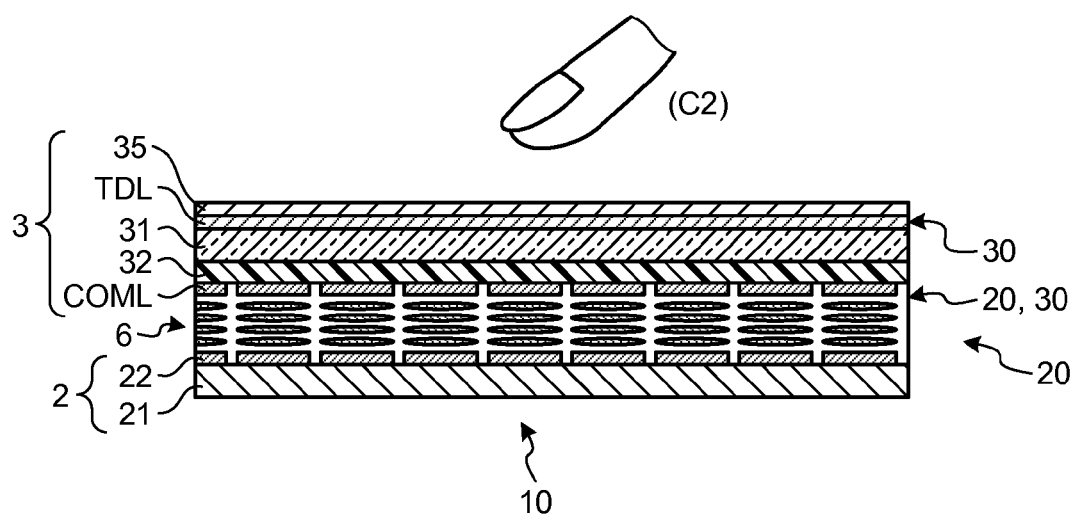
FIG. 7 is a cross-sectional view illustrating a schematic cross-sectional structure of a display device with a touch detection function according to the first embodiment.
Figure 8:
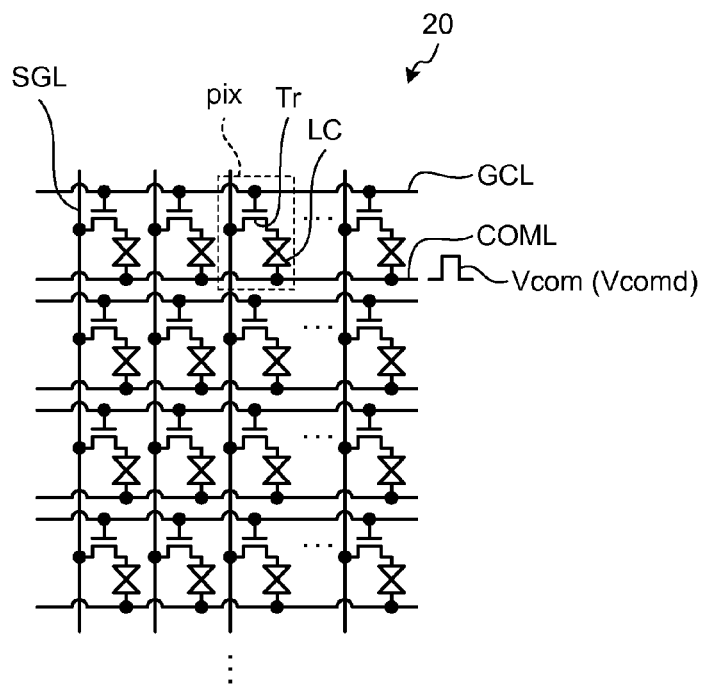
FIG. 8 is a circuit diagram representing the pixel array of the display device with a touch detection function according to the first embodiment.

FIG. 7 schematically illustrates an example of a cross-sectional structure of the display device with a touch detection function according to the first embodiment. FIG. 8 is a circuit diagram representing a pixel array of the display device with a touch detection function according to the first embodiment. The display unit 10 with a touch detection function includes a pixel substrate 2, a counter substrate 3 opposed to the pixel substrate 2, and a liquid crystal layer 6 interposed between the pixel substrate 2 and the counter substrate 3.

The pixel substrate 2 has a TFT substrate 21 serving as a circuit board and a plurality of pixel electrodes 22 provided in a matrix on the TFT substrate 21. As illustrated in FIG. 8, a thin film transistor (TFT) element Tr for each of the pixels Pix, and wiring such as the pixel signal lines SGL for supplying the pixel signal Vpix to each of the pixel electrodes 22 and the scanning signal lines GCL for driving each TFT element Tr are formed on the TFT substrate 21. The liquid crystal display device 20 illustrated in FIG. 1 has a plurality of pixels Pix arrayed in a matrix. The pixel Pix includes the TFT element Tr and a liquid crystal element LC. The TFT element Tr, which is usually formed of a thin film transistor, is formed of an n-channel metal oxide semiconductor (MOS) TFT in this example. The source of the TFT element Tr is coupled to the pixel signal line SGL; the gate is coupled to the scanning signal line GCL; and the drain is coupled to one end of the liquid crystal element LC. The liquid crystal element LC has the one end coupled to the drain of the TFT element Tr and the other end coupled to the drive electrode COML.

The pixels Pix are coupled through the scanning signal line GCL to other pixels Pix that belong to the same row of the liquid crystal display device 20. The scanning signal line GCL is coupled to the gate driver 12 and supplied with the scanning signal Vscan from the gate driver 12. The pixels Pix are also coupled through the pixel signal line SGL to other pixels Pix that belong to the same column of the liquid crystal display device 20. The pixel signal line SGL is coupled to the source driver 13 and supplied with the pixel signal Vpix from the source driver 13. Furthermore, the pixels Pix are coupled through the drive electrode COML to other pixels Pix that belong to the same row of the liquid crystal display device 20. The drive electrode COML is coupled to the drive electrode driver 14 and supplied with the drive signal Vcom from the drive electrode driver 14. In other words, in this example, the plurality of pixels Pix that belong to the same one row share one drive electrode COML.

The gate driver 12 illustrated in FIG. 1 applies the scanning signal Vscan through the scanning signal line GCL illustrated in FIG. 8 to the gate of the TFT elements Tr of one row of the pixels Pix formed in a matrix on the liquid crystal display device 20, thereby sequentially selecting the one row of the pixels Pix (one horizontal line) to be driven for display. The source driver 13 illustrated in FIG. 1 supplies the pixel signal Vpix through the pixel signal line SGL illustrated in FIG. 8 to each of the pixels Pix that constitute one horizontal line sequentially selected by the gate driver 12. Then, these pixels Pix are configured to display on one horizontal line depending on the pixel signal Vpix being supplied. The drive electrode driver 14 illustrated in FIG. 1 applies, as illustrated in FIGS. 7 and 8, the display drive signal Vcomd to a block (a drive signal applied block to be discussed later) including a predetermined number of drive electrodes COML so as to drive the drive electrodes COML in a unit of block.

As described above, the liquid crystal display device 20 is configured to drive the gate driver 12 so as to sequentially scan the scanning signal lines GCL line by line in a time divisional manner, thereby sequentially selecting one horizontal line. The liquid crystal display device 20 is also configured such that the source driver 13 supplies the pixel signal Vpix to the pixels Pix that belong to one horizontal line, thereby displaying horizontal lines one by one. To perform this display operation, the drive electrode driver 14 is configured to apply the display drive signal Vcomd to the drive signal applied block including the drive electrodes COML corresponding to the one horizontal line.

The counter substrate 3 includes a glass substrate 31, a color filter 32 formed on one surface of the glass substrate 31, and a plurality of drive electrodes COML formed on the surface of the color filter 32 opposite to the glass substrate 31. The touch detection electrodes TDL that serve as the detection electrodes of the touch detection device 30 are formed on the other surface of the glass substrate 31, with a polarizing plate 35 provided on the touch detection electrodes TDL.

The color filter 32 has a color filter layer of three colors, for example, red (R), green (G), and blue (B) which are arranged in a cyclic manner with a set of the three colors of R, G, and B associated with the respective pixels Pix illustrated in FIG. 8 above.

The drive electrodes COML according to the embodiment serve as a common drive electrode for the liquid crystal display device 20 and serve also as a drive electrode for the touch detection device 30. That is, the same electrode is used as both the common drive electrode of the liquid crystal display device 20 and the drive electrode of the touch detection device 30. Such a structure enables the entire device to be reduced in thickness and facilitates synchronization between the liquid crystal display device and the touch detection device. In the embodiment, one drive electrode COML is disposed so as to be associated with one pixel electrode 22 (the pixel electrodes 22 constituting one row). The drive electrode COML is configured such that the drive electrode driver 14 applies the AC square waveform drive signal Vcom (the display drive signal Vcomd and the touch detection drive signal Vcomt) to the drive electrode COML through a contact conductive pillar (not illustrated) having electrical conductivity.

The liquid crystal layer 6 modulates light passing therethrough depending on the state of an electric field and employs various modes of liquid crystal such as twisted nematic (TN) mode, vertical alignment (VA) mode, and electrically controlled birefringence (ECB) mode.

An alignment film may be provided between the liquid crystal layer 6 and the pixel substrate 2 as well as between the liquid crystal layer 6 and the counter substrate 3. There may also be disposed an incident-side polarizing plate on the lower surface of the pixel substrate 2.

Figure 9:
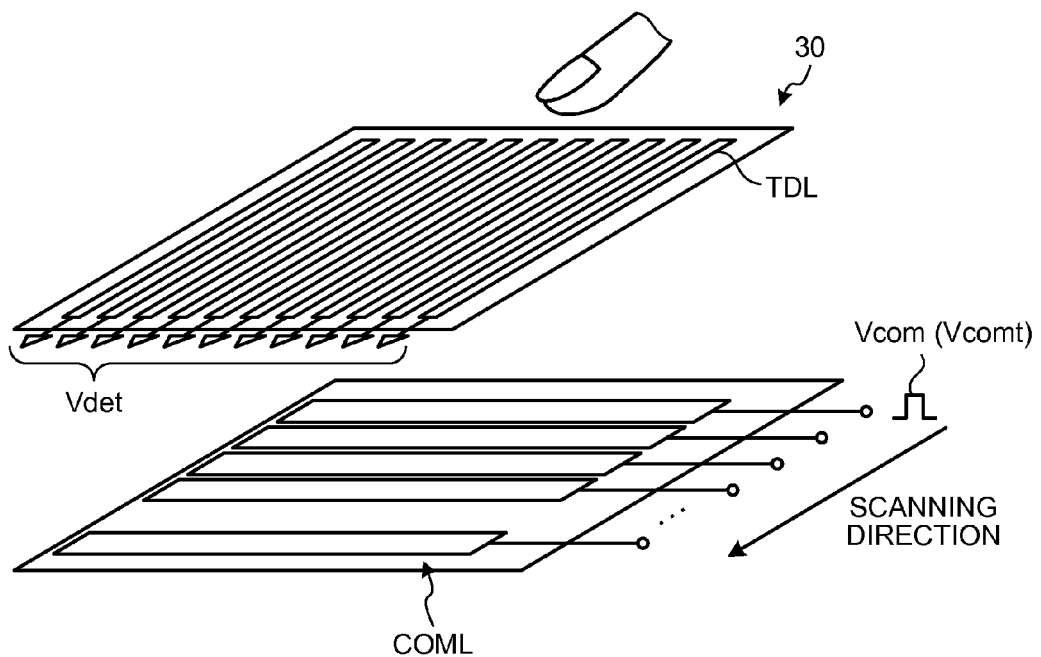
FIG. 9 is a perspective view representing an example of the structure of drive electrodes and touch detection electrodes of the display device with a touch detection function according to the first embodiment.

FIG. 9 is a perspective view illustrating an example of the structure of the drive electrodes and the touch detection electrodes of the display device with a touch detection function according to the first embodiment. The touch detection device 30 includes the drive electrodes COML and the touch detection electrodes TDL which are provided on the counter substrate 3. The drive electrodes COML are divided into a plurality of striped electrode patterns that extend from side to side in the figure. To perform the touch detection operation, sequential scanning drive is to be performed on each electrode pattern by the drive electrode driver 14 supplying the drive signal Vcom (the touch detection drive signal Vcomt) sequentially to one of the drive signal applied blocks A1 to Ai, to be discussed later, in the scanning direction. The touch detection electrodes TDL are formed in a striped electrode pattern that extends in a direction that intersects the extending direction of the electrode pattern of the drive electrodes COML. Each electrode pattern of the touch detection electrodes TDL is coupled to the input of the analog filter 42 of the touch detection unit 40. The electrode patterns of the drive electrodes COML and the touch detection electrodes TDL that intersect each other provide capacitance at the intersections thereof.

In the touch detection device 30 with this configuration, when the touch detection operation is performed, the drive electrode driver 14 drives a drive electrode block so as to scan the same linearly sequentially in a time divisional manner, to thereby sequentially select one detection block. Then the detection signal Vdet is outputted through the touch detection electrodes TDL, thereby performing the touch detection on the one detection block. That is, in the basic principle of touch detection mentioned above, the drive electrode block corresponds to the drive electrode E1 and the touch detection electrode TDL corresponds to the touch detection electrode E2, allowing the touch detection device 30 to detect a touch in accordance with the basic principle. As illustrated in FIG. 9, the electrode patterns intersecting each other constitute a capacitive touch sensor in a matrix. Therefore, it is possible to scan across the entire touch detection surface of the touch detection device 30, thereby detecting the position at which an external proximity object is brought into contact with or proximity to the device.

1-1D. Outline of Entire Operation

Figure 10:
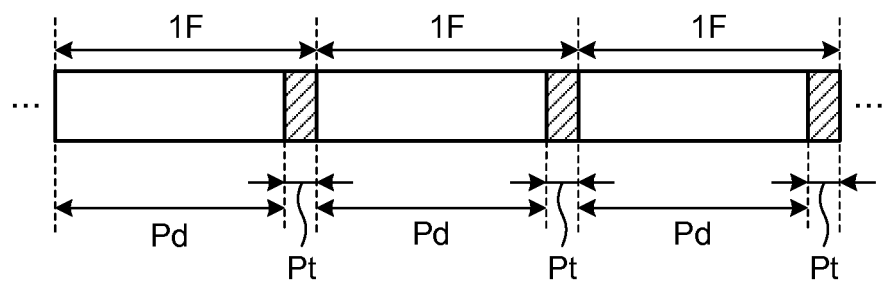
FIG. 10 is a schematic view representing the relationship between a display operation period and a touch detection period.

Concerning the operation of the display device 1 with a touch detection function according to the first embodiment, a description will be made first to the outline of the entire operation. FIG. 10 is a schematic view representing the relationship between the display operation period and the touch detection period.

As illustrated in FIG. 10, one frame period (1F) includes a display operation period Pd and a touch detection period Pt. The touch detection period Pt occupies a vertical blanking period of the display operation. Then, the display device 1 with a touch detection function repeatedly performs the display operation on a screen GS in the display operation period Pd and the touch detection operation on the screen GS in the touch detection period Pt. The display device 1 with a touch detection function performs one screenful of display operation on the screen GS in each display operation period Pd, while performing one screenful of touch detection operation on the screen GS in each touch detection period Pt.

First, in response to the video signal Vdisp supplied from outside, the control unit 11 outputs a control signal to each of the gate driver 12, the source driver 13, the drive electrode driver 14, and the touch detection unit 40 and provides control thereto so that these devices operate in synchronization with each other. Of these devices, the gate driver 12 outputs the scanning signal Vscan to the liquid crystal display device 20 in the display operation period Pd, so that one horizontal line to be displayed of the pixels Pix formed in a matrix in the liquid crystal display device 20 is sequentially selected.

The source driver 13 outputs the pixel signal Vpix in the display operation period Pd to each of the pixels Pix that constitute one horizontal line selected by the gate driver 12. In the display operation period Pd, the drive electrode driver 14 applies the display drive signal Vcomd in turn to the drive signal applied blocks A1 to Ai which include a predetermined number of drive electrodes COML corresponding to each one horizontal line selected by the gate driver 12. In this manner, in the display operation period Pd, the display unit 10 with a touch detection function performs the display operation in accordance with the signals outputted by the gate driver 12, the source driver 13, and the drive electrode driver 14.

Next, in the touch detection period Pt, the drive electrode driver 14 sequentially applies the touch detection drive signal Vcomt to the drive signal applied blocks A1 to Ai on which the touch detection operation is performed, thereby sequentially selecting one drive electrode block in which a touch is to be detected. In the touch detection period Pt, the display unit 10 with a touch detection function performs the touch detection operation in response to the signal outputted from the drive electrode driver 14 and outputs the detection signal Vdet through the touch detection electrodes TDL. In the touch detection period Pt, the analog filter 42 serves as a low-pass analog filter which removes a high-frequency component (noise component) contained in the detection signal Vdet outputted from the touch detection electrodes TDL of the touch detection device 30 and which extracts touch components to output each component. In the touch detection period Pt, the signal processor 44 detects, in response to the output signal from the A/D converter 43, whether or not there is a touch on the touch detection device 30. In the display operation period Pd, the signal processor 44 detects, in response to the output signal from the A/D converter 43, whether or not there is a frequency component of those of a disturbance noise having a frequency equivalent to the frequency of the touch detection drive signal Vcomt. In the touch detection period Pt, the coordinate extractor 45 determines the coordinates of a touch on the touch detection device 30 when the touch is detected by the signal processor 44 and then outputs the coordinates data as the output signal Out.

The detection timing controller 47 provides control so that the analog filter 42, the A/D converter 43, the signal processor 44, the coordinate extractor 45, and the noise detector 46 operate in synchronization with each other.

The display device 1 with a touch detection function performs one screenful of operation of the screen GS in each period. However, the embodiment is not limited thereto. For example, it may also be possible to perform one or more screenfuls of operation of the screen GS or one or less screenful of operation.

In the touch detection period Pt in which the touch detection operation is performed, the liquid crystal display device 20 is not supplied with the various signals (the scanning signal Vscan and the pixel signal Vpix) for performing the display operation. Thus, in the touch detection period Pt, the scanning signal lines GCL and the pixel signal lines SGL (not illustrated) which are formed on the pixel substrate 2 assume a floating state or stay with a DC potential applied thereto. This makes it possible to reduce the possibility of noises being transmitted from the scanning signal lines GCL and the pixel signal lines SGL to the touch detection electrodes TDL through parasitic capacitance. That is, the display device 1 with a touch detection function according to the embodiment makes it possible to reduce the effects that internal noises have on the touch detection operation.

Figure 11:
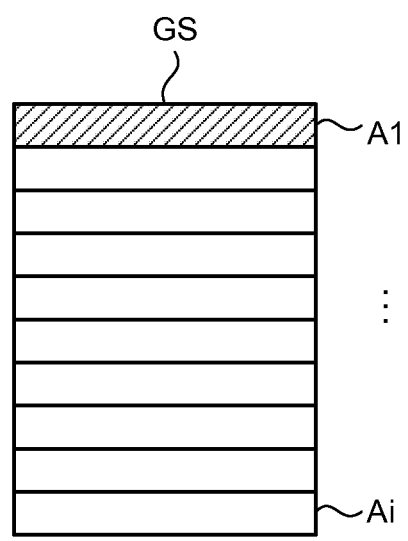
FIG. 11 is a schematic view representing an example of an operation of a drive electrode driver according to the first embodiment.
Figure 12:
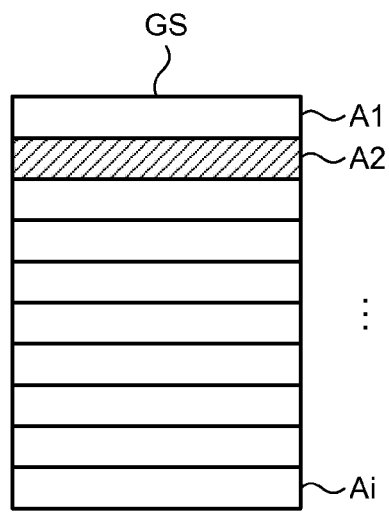
FIG. 12 is a schematic view representing an example of an operation of the drive electrode driver according to the first embodiment.
Figure 13:
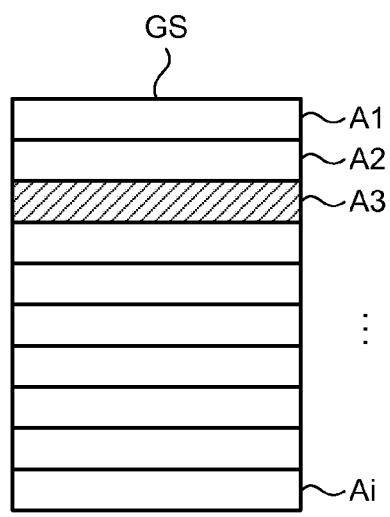
FIG. 13 is a schematic view representing an example of an operation of the drive electrode driver according to the first embodiment.

FIGS. 11, 12, and 13 schematically illustrate an example of an operation of the drive electrode driver according to the first embodiment. The screen GS of the display unit 10 with a touch detection function illustrated in FIG. 11 is divided into the drive signal applied block A1 to the drive signal applied block Ai, for example, ten drive signal applied blocks. For example, in the touch detection period Pt of one frame period (1F), the drive electrode driver 14 applies the touch detection drive signal Vcomt at the same time to a predetermined number of drive electrodes COML corresponding to the drive signal applied block A1. As illustrated in FIG. 12, in the touch detection period Pt of the next one frame period (1F), the drive electrode driver 14 applies the touch detection drive signal Vcomt at the same time to a predetermined number of drive electrodes COML corresponding to the drive signal applied block A2. Then, as illustrated in FIG. 13, in the touch detection period Pt of the next one frame period (1F), the drive electrode driver 14 applies the touch detection drive signal Vcomt at the same time to a predetermined number of drive electrodes COML corresponding to the drive signal applied block A3. In this manner, the drive electrode driver 14 applies the touch detection drive signal Vcomt at the same time to a predetermined number of drive electrodes COML and sequentially applies the touch detection drive signal Vcomt to the drive signal applied blocks A1 to Ai, thereby performing touch detection scanning.

1-1E. Display Operation in the Display Operation Period Pd

Now, referring to FIG. 14, the display operation in the display operation period Pd will be described in more detail.

Figure 14:
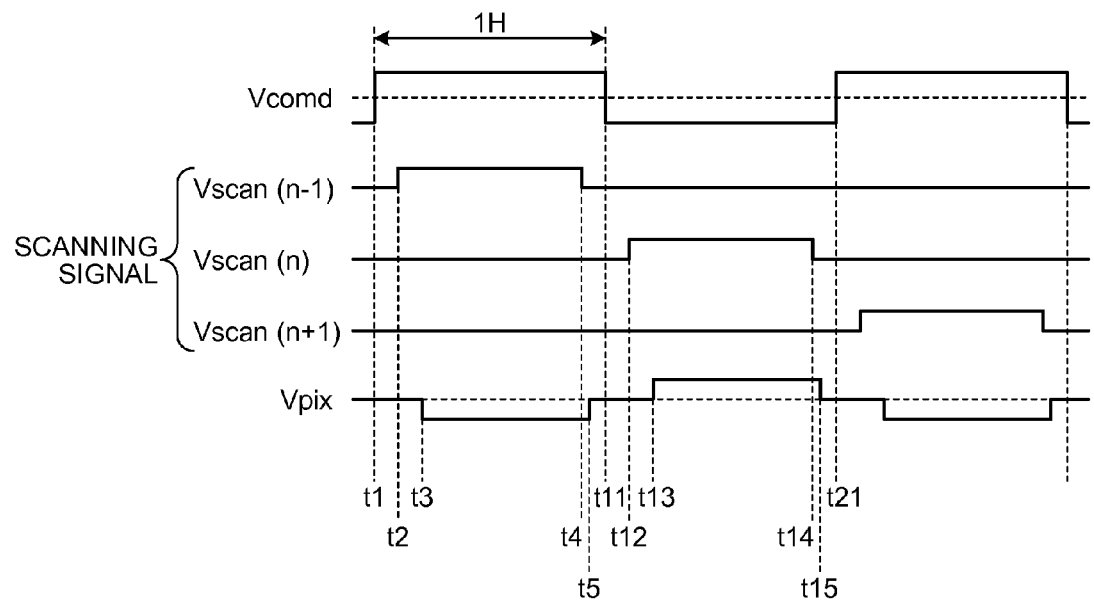
FIG. 14 is a waveform diagram representing an example of a timing of each signal in a display operation period.

FIG. 14 is a waveform diagram representing an example of the timing of each signal in the display operation period. FIG. 14 illustrates the waveforms of the display drive signal Vcomd, the scanning signal Vscan, and the pixel signal Vpix. FIG. 14 is an example in which the line inversion driving method is employed in the display operation period Pd. Now, a description will be made to the case where a particular drive signal applied block A1 of the drive signal applied blocks A1 to Ai of the screen GS is to be driven.

At timing t1, the drive electrode driver 14 applies the display drive signal Vcomd to the drive signal applied block A1 to change the voltage level thereof from a low level to a high level. From the point at which the voltage level of the display drive signal Vcomd has changed, one horizontal period (1H) is started.

Next, at timing t2, the gate driver 12 applies the scanning signal Vscan to the scanning signal line GCL corresponding to the plurality of pixels Pix of one horizontal line on the (n−1)th row included in the drive signal applied block A1 so as to change the voltage level from a low level to a high level.

Next, at timing t3, the source driver 13 applies the pixel signal Vpix to the pixel signal lines SGL to change the voltage level to a low level, thus starting the display operation on the plurality of pixels Pix of one horizontal line on the (n−1)th row.

Next, at timing t4, the gate driver 12 changes, from a high level to a low level, the voltage level of the scanning signal Vscan that is applied to the scanning signal line GCL corresponding to the plurality of pixels Pix of one horizontal line on the (n−1)th row. Subsequently, at timing t5, the source driver 13 terminates the application of the pixel signal Vpix.

Next, at timing t11, the drive electrode driver 14 changes the voltage level of the display drive signal Vcomd from a high level to a low level. This causes one horizontal period (1H) to be ended and the next one horizontal period (1H) to be started.

At timing t12 in the next one horizontal period (1H), the gate driver 12 applies the scanning signal Vscan to the scanning signal line GCL corresponding to the plurality of pixels Pix of one horizontal line on the n-th row included in the drive signal applied block A1, changing the voltage level thereof from a low level to a high level.

Next, at timing t13, the source driver 13 applies the pixel signal Vpix to the pixel signal lines SGL to change the voltage level to a high level, thus starting the display operation on the plurality of pixels Pix of one horizontal line on the n-th row. Since the display device 1 with a touch detection function performs the inversion driving method in this example, the pixel signal Vpix applied by the source driver 13 has an inverted polarity with respect to the one in the previous one horizontal period (1H).

Subsequently, at timing t14, the gate driver 12 changes, from a high level to a low level, the voltage level of the scanning signal Vscan that is applied to the scanning signal line GCL corresponding to the plurality of pixels Pix of one horizontal line on the n-th row. After that, at timing t15, the source driver 13 terminates the application of the pixel signal Vpix.

From then onward, the display device 1 with a touch detection function repeats the procedure mentioned above, thereby performing the display operation on the drive signal applied block A1 of the screen GS. As described above, the display device 1 with a touch detection function performs the aforementioned display operation on each of the drive signal applied blocks A1 to Ai while sequentially shifting the blocks, to which the drive signal is applied, from the drive signal applied block A1 downwardly, thereby performing the display operation on the entire surface of the screen GS.

While performing the aforementioned display operation on the screen GS in the display operation period Pd, the display device 1 with a touch detection function detects disturbance noises on the screen GS that act as a noise upon detection of a touch. More specifically, the display device 1 with a touch detection function performs an operation (noise detection operation) of detecting a frequency component of those of a disturbance noise having a frequency equivalent to the frequency of the touch detection drive signal Vcomt on the screen GS and changing the frequency of the touch detection drive signal Vcomt outputted by the drive electrode driver 14 to a different frequency at the time of the touch detection operation in the next touch detection period Pt.

1-1F. Touch Detection Operation in the Touch Detection Period Pt

Figure 15:
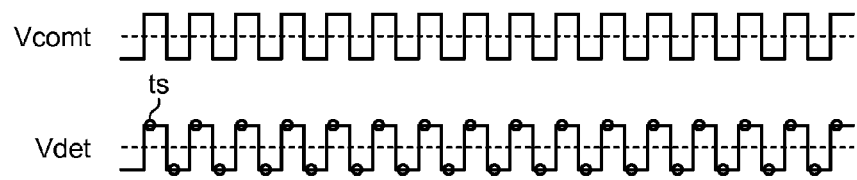
FIG. 15 is a waveform diagram representing an example of a timing of each signal in a touch detection period.

Now, referring to FIG. 15, the touch detection operation in the touch detection period Pt will be described in detail. FIG. 15 is a waveform diagram representing an example of the timing of each signal in a touch detection period. FIG. 15 illustrates the waveforms of the touch detection drive signal Vcomt and the detection signal Vdet. Now, a description will be made to the case where a particular drive signal applied block A1 among the drive signal applied blocks A1 to Ai of the screen GS is to be driven.

In the touch detection period Pt, the drive electrode driver 14 applies the touch detection drive signal Vcomt to the drive signal applied block A1. It is desirable that the frequency of the touch detection drive signal Vcomt be different from the frequency of the display drive signal Vcomd in the display operation period Pd.

The touch detection drive signal Vcomt applied to the drive signal applied block A1 is transmitted to the touch detection electrodes TDL through capacitance, causing a change in the detection signal Vdet.

Next, the A/D converter 43 A/D converts the output signal from the analog filter 42, to which the detection signal Vdet has been supplied, with the sampling timing ts (or at a sampling frequency higher than the frequency of the sampling timing ts) that is in synchronization with the touch detection drive signal Vcomt. That is, the A/D converter 43 performs sampling in a cycle shorter than the cycle of the touch detection drive signal Vcomt.

Next, the signal processor 44 detects in response to the output signal from the A/D converter 43 whether there is a touch on the touch detection device 30. For example, in the method for detecting whether there is a touch, a determination is made for the detection based on a threshold value as described above.

Next, upon detection of a touch by the signal processor 44, the coordinate extractor 45 determines the coordinates thereof on the touch detection device 30 and outputs the coordinates data as the output signal Out.

The display device 1 with a touch detection function performs the operation mentioned above for the touch detection operation on the drive signal applied block A1 of the screen GS. As described above, the display device 1 with a touch detection function performs the aforementioned touch detection operation on each of the drive signal applied blocks A1 to Ai while sequentially shifting the blocks, to which the drive signal is applied, from the drive signal applied block A1 downwardly, thereby performing the touch detection operation on the entire surface of the screen GS.

1-1G. Noise Detection Operation in the Display Operation Period Pd

Figure 16:
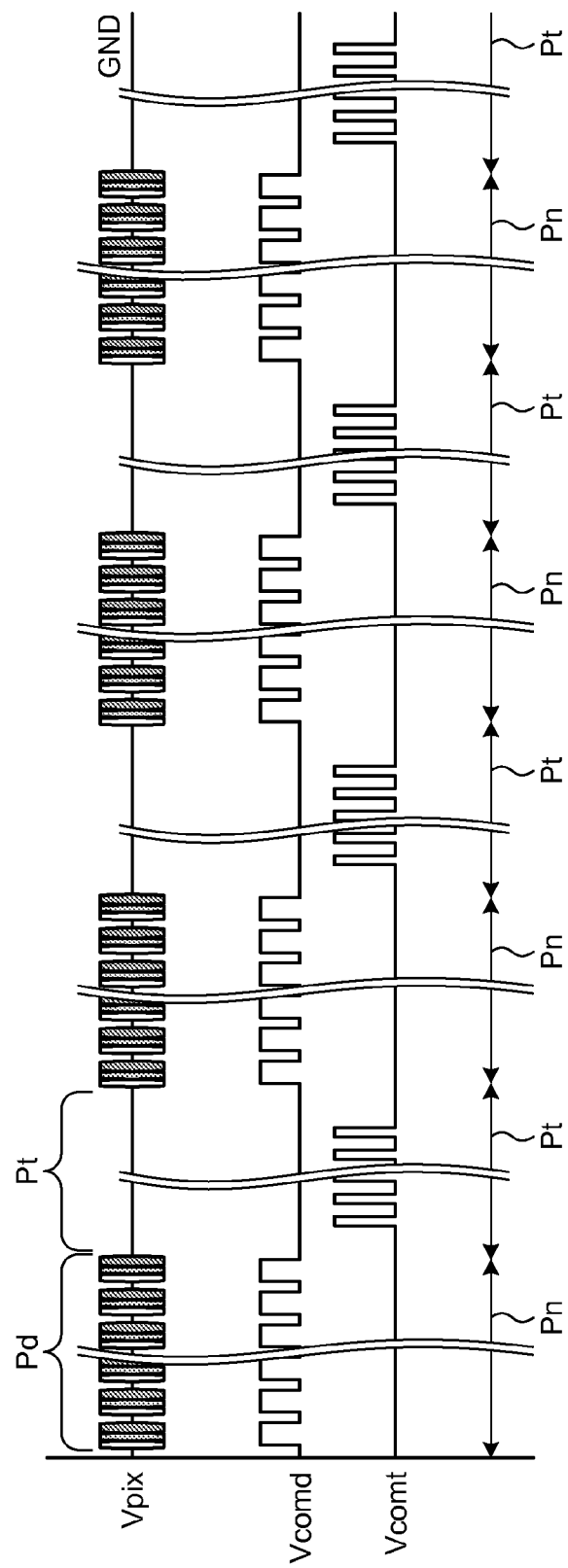
FIG. 16 is a schematic diagram illustrating the waveform of each signal when a display operation period and a touch detection period are repeated.

FIG. 16 is a schematic diagram illustrating the waveform of each signal when the display operation period and the touch detection period are repeated. As illustrated in FIG. 16, the display device 1 with a touch detection function has the display operation period Pd and the touch detection period Pt which are alternately set. The display device 1 with a touch detection function outputs the pixel signal Vpix and the display drive signal Vcomd in the display operation period Pd, and executes the aforementioned operation to thereby execute an RBG display operation.

The display device 1 with a touch detection function of the embodiment is provided with a noise detection period Pn in the display operation period Pd so as to detect the detection signal Vdet in the display operation period Pd and execute a noise detection operation. That is, the display device 1 with a touch detection function is configured such that the noise detection period Pn and the touch detection period Pt are alternately set in the same manner as the display operation period Pd and the touch detection period Pt are related to each other. The display device 1 with a touch detection function acquires the detection signal Vdet in the noise detection period Pn to detect noise, while acquiring the detection signal Vdet in the touch detection period Pt to detect a touch.

Now, a description will be made more specifically to the noise detection operation in the noise detection period Pn, i.e., the display operation period Pd. As illustrated in FIG. 16, since the noise detection period Pn is also the display operation period Pd, the processing for displaying images is performed in parallel. First, in the touch detection unit 40, the analog filter 42 is supplied with the detection signal Vdet outputted from the touch detection electrodes TDL. The detection signal Vdet contains the frequency component that appears along with the display drive signal Vcomd outputted from the drive electrode driver 14, the LCD noise, and the disturbance noise. The analog filter 42 passes therethrough a predetermined range of frequency components of the detection signal Vdet that include a frequency component of those of the disturbance noise having the frequency of the touch detection drive signal Vcomt at the current point in time. This allows the analog filter 42 to remove or reduce the LCD noise component and the component at a frequency not included in the predetermined range which appears along with the display drive signal Vcomd outputted from the drive electrode driver 14.

Next, in the touch detection unit 40, the A/D converter 43 samples and converts, from analog to digital, the analog signal outputted from the analog filter 42 at the timing in synchronization with the display drive signal Vcomd or at a sampling frequency higher than the frequency of that timing.

Figure 17:
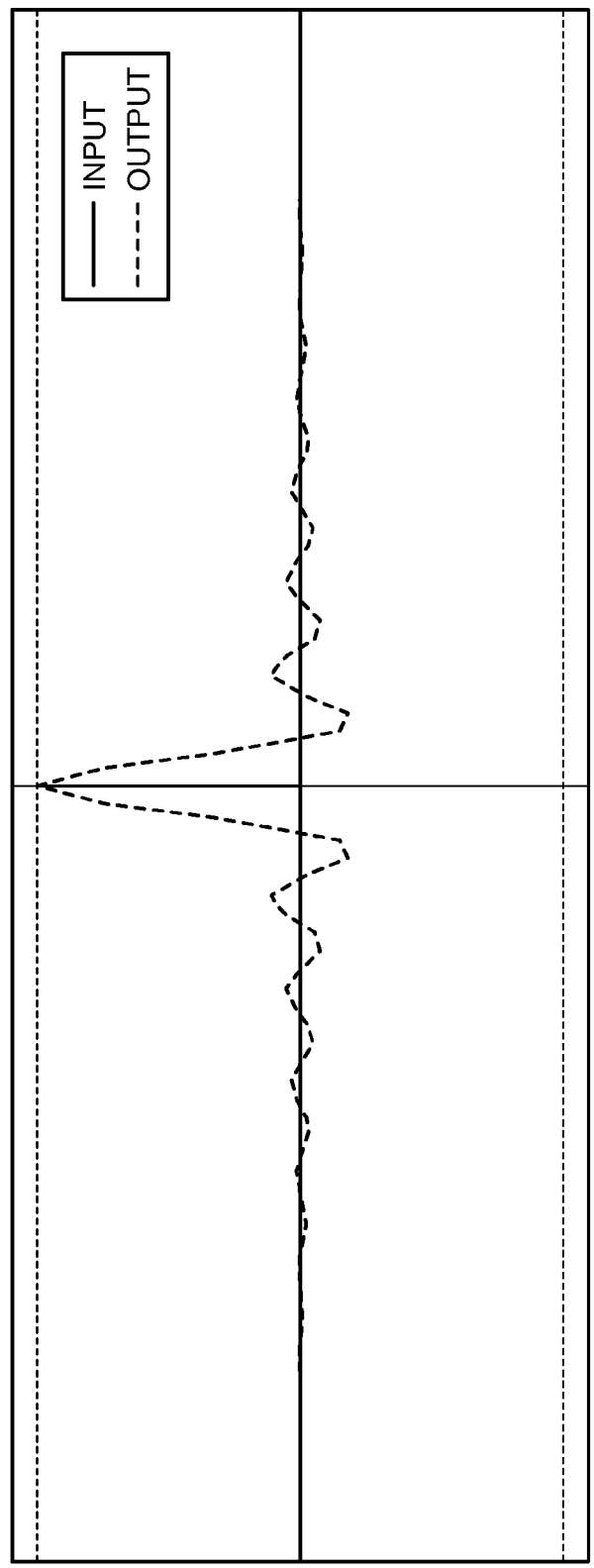
FIG. 17 is a view illustrating an example of a filter for selectively extracting a particular frequency.

The touch detection unit 40 may simply add data when filtering or sampling using a low-pass filter (LPF) and/or a bandpass filter (BPF), but may also acquire a digital signal that is sampled by being weighted according to the required number of taps so as to selectively pass therethrough only a particular frequency. In this case, after converting from analog to digital, the touch detection unit 40 filters the resulting signal and then acquires the sampled digital signal. FIG. 17 illustrates an example of a filter for selectively extracting a particular frequency. FIG. 17 illustrates a 50-tap finite impulse response (FIR) filter. The filter illustrated in FIG. 17 can acquire an output signal by weighting and selectively extracting an impulse response input.

Next, in the touch detection unit 40, the signal processor 44 detects, on the output signal from the A/D converter 43, whether a component having the same frequency as or a frequency in the vicinity of the currently set frequency of the touch detection drive signal Vcomt has a predetermined level (threshold level) or greater. This makes it possible to determine whether the frequency component of the touch detection drive signal Vcomt contained in disturbance noise has a predetermined level or greater.

Then, in the touch detection unit 40, the noise detector 46 outputs a noise notice signal for the touch detection signal to the control unit 11 when the signal processor 44 has detected the frequency component of those of a disturbance noise having a frequency that is the same as or in the vicinity of the frequency of the touch detection drive signal Vcomt, that is, when it has been determined that the frequency component of the touch detection drive signal Vcomt contained in the disturbance noise has a predetermined level or greater. Upon detection of the noise notice signal, the control unit 11 selects a frequency different from that frequency from the stored selection candidate frequencies, and then changes the frequency of the touch detection drive signal Vcomt to the selection candidate frequency that has been selected. Thus, the noise notice signal serves to select a frequency different from that frequency from the stored selection candidate frequencies and change the frequency of the touch detection drive signal Vcomt to the selection candidate frequency that has been selected.

Figure 18:
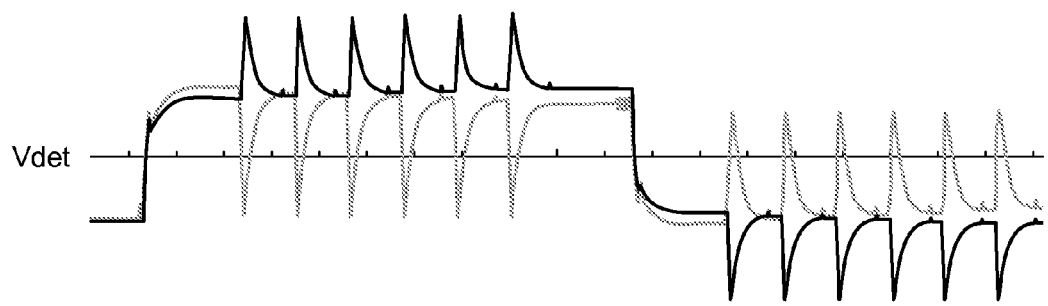
FIG. 18 is an explanatory view illustrating an example of a detection signal Vdet in a display operation period.
Figure 19:
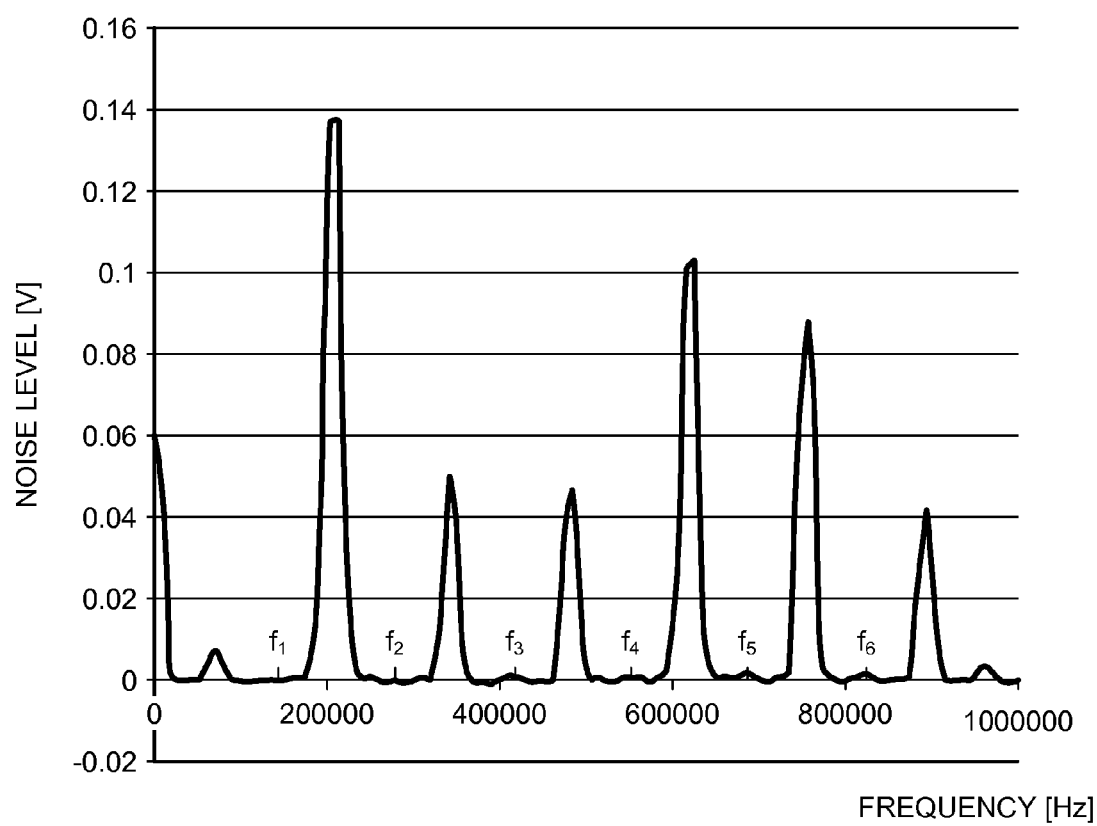
FIG. 19 is a schematic diagram illustrating an example of the result of a Fourier transform of the detection signal Vdet in a display operation period.

FIG. 18 is an explanatory view illustrating an example of the detection signal Vdet in the display operation period. FIG. 19 is a schematic diagram illustrating an example of the result of a Fourier transform of the detection signal Vdet in the display operation period. FIGS. 18 and 19 illustrate a detection result with no disturbance noise superimposed, that is, the result of detecting a signal that has occurred by the display operation of an image (by a pixel write operation). In FIG. 19, the horizontal axis represents the frequency and the vertical axis represents the noise level.

As described above, in the touch detection period Pt, the drive electrode driver 14 applies the touch detection drive signal Vcomt at a predetermined frequency to the drive electrodes COML, thereby allowing the detection signal Vdet at the same frequency as that of the touch detection drive signal Vcomt to be outputted from the touch detection electrodes TDL through capacitance. Likewise, in the display operation period Pd, the drive electrode driver 14 applies the display drive signal Vcomd at a predetermined frequency to the drive electrodes COML, thereby allowing the detection signal Vdet at the same frequency as that of the display drive signal Vcomd to be outputted from the touch detection electrodes TDL through capacitance. Moreover, as described above, in the display operation in the display operation period Pd, the voltages of the drive electrodes COML and the touch detection electrodes TDL will have a noise (LCD noise) due to an ON/OFF operation of the scanning signal Vscan applied from the gate driver 12 to the scanning signal lines GCL and a repeated operation between the high and low voltage levels of the pixel signal Vpix applied to the pixel signal lines SGL from the source driver 13.

FIG. 18 illustrates the detection signal Vdet which is outputted from the touch detection electrodes TDL with an LCD noise superimposed thereon. Thus, to detect a disturbance noise propagated to the touch detection electrodes TDL, the LCD noise superimposed on the touch detection electrodes TDL needs to be removed. FIG. 19 illustrates the LCD noise that is Fourier transformed into a frequency spectrum. The display device 1 with a touch detection function computes in advance the frequency spectrum of the LCD noise as illustrated in FIG. 19 and sets, as selection candidate frequencies, the frequencies at which the LCD noises have low frequency components, for example, frequencies $f_1$, $f_2$, $f_3$, $f_4$, $f_5$, and $f_6$. This makes it possible to prevent the selected frequency of the touch detection drive signal Vcomt from being superimposed on the frequency of the LCD noise. The display device 1 with a touch detection function can be configured to form the analog filter 42 in accordance with a selection candidate frequency, thereby passing therethrough no frequency component of those of the LCD noise that has a noise level appearing as a peak. The selection candidate frequency is preferably a frequency at which the LCD noise is 30 db or less, more preferably a frequency at which the LCD noise is 10 db or less. The LCD noise being 30 db or less can make the jitter 1% or less. The LCD noise being 10 db or less can reduce the influence of the LCD noise with reliability.

The touch detection unit 40 does not allow the noise detector 46 to output the noise notice signal when the signal processor 44 does not detect a frequency component of those of the disturbance noise having the same frequency as or a frequency in the vicinity of that of the touch detection drive signal Vcomt. This allows the drive frequency to be maintained at the current frequency.

It should be noted that either the control unit 11 may determine which frequency to select from the selection candidate frequencies or the noise detector 46 may detect the frequency.

The aforementioned operations allow the display device 1 with a touch detection function to perform the display operation as well as the noise detection operation on each of the drive signal applied blocks A1 to Ai of the screen GS. The electrode pattern of the drive electrodes COML included in the drive signal applied block A1 intersects the touch detection electrodes TDL that extend in a plurality of stripe-shaped electrode patterns. Thus, when the noise detection operation is performed on each drive electrode block, the detection signal Vdet is supplied to the analog filter 42 by the number of electrode patterns of the touch detection electrodes TDL. In this case, for example, when a frequency component of those of the disturbance noise having the same frequency as or a frequency in the vicinity of that of the touch detection drive signal Vcomt has been detected on at least one or more of a plurality of detection signals Vdet, the frequency may be changed; or alternatively, when the frequency component has been found on a predetermined number of signals or more of the plurality of detection signals Vdet, the frequency may also be changed. Then, the aforementioned noise detection operation is performed on each of the drive signal applied blocks A1 to Ai while the drive signal applied blocks A1 to Ai are being sequentially shifted downwardly, thereby performing the noise detection operation on the entire surface of the screen GS. The display device 1 with a touch detection function of the embodiment is described as employing the line inversion driving method to vary the display drive signal Vcomd line by line; however, the embodiment is not limited thereto. It is also acceptable to employ the dot inversion driving method and/or the column inversion driving method in which the display drive signal Vcomd is not varied in an image period. That is, the display drive signal Vcomd to be employed may not be limited to an AC square waveform but may also be a DC voltage signal at any level.

1-1H. Effects of the First Embodiment

The display device 1 with a touch detection function executes the noise detection operation in the noise detection period Pn to detect a disturbance noise at the frequency of the touch detection drive signal Vcomt, thereby allowing for preventing degradation in the accuracy of the touch detection operation caused by the disturbance noise. For example, as with the embodiment, when a frequency component of those of the disturbance noise having the same frequency as or a frequency in the vicinity of that of the touch detection drive signal Vcomt is detected in the detection signal Vdet, the frequency of the touch detection drive signal Vcomt can be changed to a different frequency, thereby preventing the occurrence of a malfunction caused by the disturbance noise in the touch detection operation.

Since the noise detection operation can be performed in conjunction with the display operation in the display operation period Pd, it is possible to prevent the display operation period Pd and the touch detection period Pt from being temporally reduced in length. This makes it possible to extend the display operation period Pd and the touch detection period Pt, thereby allowing the display operation and the touch detection operation to be improved in performance.

The display device 1 with a touch detection function is desirably configured such that the frequency of the touch detection drive signal Vcomt is different from the frequency of the display drive signal Vcomd. This can prevent the components of the display drive signal Vcomd from passing through the analog filter 42. It is thus possible to distinguish whether a signal passing through the analog filter 42 has a signal component arising from the display drive signal Vcomd or a frequency component of those of the disturbance noise having the same frequency as or a frequency in the vicinity of that of the touch detection drive signal Vcomt, thereby detecting the disturbance noise in an appropriate manner.

The noise detection operation may not be limited to being performed in each display operation period Pd, but may also be performed at intervals of a predetermined number of display operation periods Pd.

The display operation period Pd and the touch detection period Pt may also be provided so as to be alternately repeated multiple times in one frame period (1F). That is, the display operation period Pd may be divided into a plurality of periods by interrupting the display scanning so as to provide the touch detection operation period in the interrupted display scanning period. The touch detection period Pt may not be limited to the vertical blanking period but may also be provided in the horizontal blanking period. The touch detection period Pt may also be provided in a period other than the aforementioned periods, i.e., in a non-display-operation period that is arbitrarily placed as a display blanking period in one frame period.

In the aforementioned embodiment, as illustrated in the first embodiment described above, the drive electrodes COML were driven by each drive signal applied block Ai for scanning. However, the embodiment is not limited thereto. In place of this configuration, for example, the scan operation may be performed by shifting a predetermined number of drive electrodes COML one by one while driving the predetermined number of drive electrodes.

The display device 1 with a touch detection function according to each of the embodiments and modifications can be modified into a display unit 10 with a touch detection function which integrally includes the liquid crystal display device 20, incorporating various modes of liquid crystal such as TN mode, VA mode, or ECB mode, and the touch detection device 30. In place of this configuration, the display unit 10 with a touch detection function may integrally include the liquid crystal display device, incorporating a transverse electric field mode liquid crystal, such as the fringe field switching (FFS) mode or the in-plane switching (IPS) mode, and the touch detection device.

Figure 20:
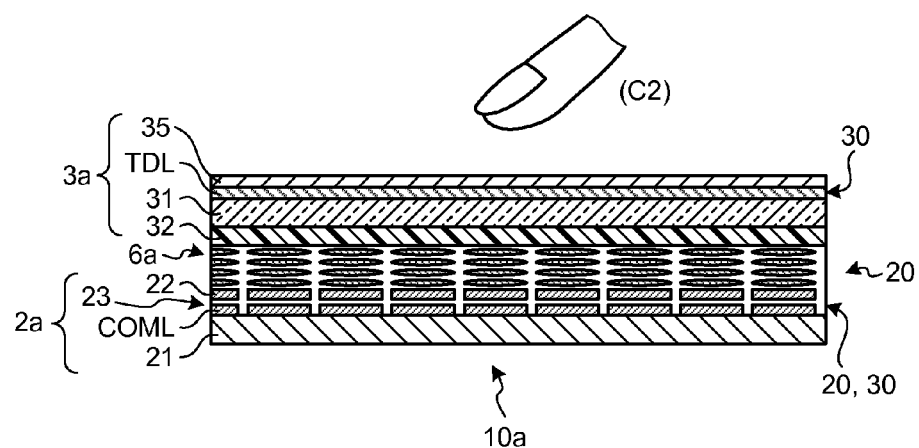
FIG. 20 is a cross-sectional view illustrating a schematic cross-sectional structure of a display device with a touch detection function, for example, according to a modification.

For example, when a display device 1a with a touch detection function employs the transverse electric field mode liquid crystal, a display unit 10a with a touch detection function can be constructed as illustrated in FIG. 20. FIG. 20 is a view representing an example of a schematic cross-sectional structure of the display unit 10a with a touch detection function, illustrating a liquid crystal layer 6a sandwiched between a pixel substrate 2a and a counter substrate 3a. The names and functions of the other components are the same as those of FIG. 7, and thus will not be repeatedly explained. In this example, unlike the case of FIG. 7, the drive electrodes COML used for both display and touch detections are formed immediately on top of the TFT substrate 21 so as to form part of the pixel substrate 2a. Above the drive electrodes COML, the pixel electrodes 22 with an insulating layer 23 therebetween are disposed. In this case, all the dielectrics, including the liquid crystal layer 6a, between the drive electrodes COML and the touch detection electrodes TDL contribute to the formation of the capacitive element C1.

For example, each embodiment described above employs a so-called in-cell type apparatus that integrally includes the liquid crystal display device and the capacitive touch detection device. However, the embodiment is not limited thereto. In place of this configuration, for example, the liquid crystal display device may be provided with a capacitive touch detection device. Even in this case, the aforementioned effects can be obtained by employing the configurations and operations described above.

1-2. Second Embodiment

Now, a display device 1b with a touch detection function according to an embodiment will be described by mainly focusing attention on the differences from the display device 1 with a touch detection function according to the first embodiment.

1-2A. Configuration of the Display Device with a Touch Detection Function

Figure 21:
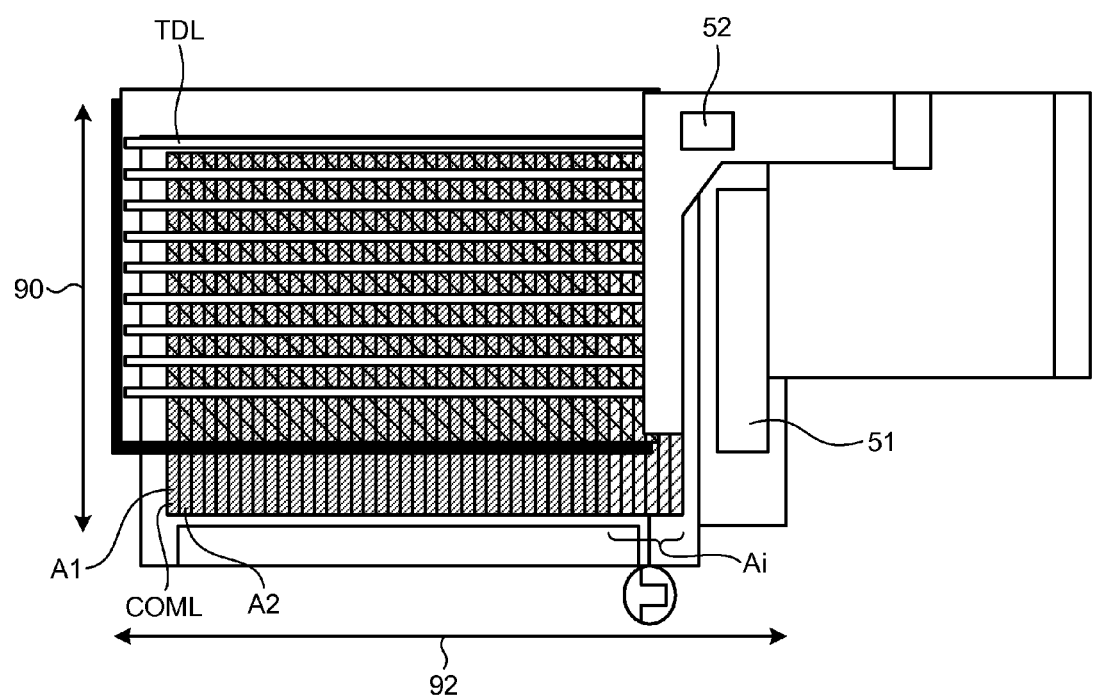
FIG. 21 is a schematic view illustrating another schematic structure of a display device with a touch detection function according to a second embodiment.

FIG. 21 is a schematic view illustrating another schematic structure of the display device with a touch detection function according to the second embodiment. The display device 1b with a touch detection function illustrated in FIG. 21 includes a driver IC 51 which applies the drive signal Vcom to the drive electrodes COML and has an arithmetic function to compute LCD noise information and a touch IC 52 for receiving the detection signal Vdet outputted from the touch detection electrodes TDL. The driver IC 51 is equivalent to the drive electrode driver 14 of the display device 1 with a touch detection function according to the first embodiment (or all of the gate driver 12, the source driver 13, and the drive electrode driver 14). The touch IC 52 is equivalent to the touch detection unit 40 of the display device 1 with a touch detection function according to the first embodiment. The driver IC 51 and the touch IC 52 are electrically coupled to each other so as to be capable of communicating with each other.

1-2B. Noise Detection Operation in the Display Operation Period Pd

Now, a description will be made to the noise detection operation in the display operation period Pd. The display operation in the display operation period Pd and the touch detection operation in the touch detection period Pt are the same as those of the first embodiment.

As in the first embodiment, the display device 1b with a touch detection function according to the embodiment performs the noise detection operation in conjunction with the display operation on each of the drive signal applied blocks A1 to Ai of the screen GS. The LCD noise on the detection signal Vdet outputted from the touch detection electrodes TDL was described in relationship to FIG. 18 above, but the same LCD noise is also superimposed on the drive electrodes COML. In the display operation period Pd, the driver IC 51 applies the display drive signal Vcomd to the drive signal applied blocks A1 to Ai. The driver IC 51 also determines the computed value of the LCD noise in response to a signal supplied to the plurality of drive electrodes COML that constitute the drive signal applied block and then stores the information. More specifically, the driver IC 51 stores, in a table and/or map, the relationship between an image signal component (for example, a coefficient to be computed by taking into account the ratio of R, G, and B being turned on, the gray scale level of writing from the signal line, and/or the voltage direction of the signal) and a signal component (LDC noise) to be caused on the touch detection electrodes TDL by displaying the image signal. When having detected an image signal to a block of the drive signal applied blocks A1 to Ai, the driver IC 51 can compute the LCD noise component by analyzing the image signal based on the table and/or the map. The computed value of the LCD noise is made uniform on the same drive electrode COML that extends in a direction (direction denoted by arrow 90) intersecting the extending direction of the electrode pattern of the touch detection electrodes TDL. However, the computed value has different values in the direction (direction denoted by arrow 92) of each of the drive electrodes COML that are parallel to each other. While the display operation is performed on each of the drive signal applied blocks A1 to Ai, the driver IC 51 stores the value of the LCD noise detected on each of the drive electrodes COML and determined by computation, and adds the stored computed values of the LCD noises. Then, while sequentially shifting the drive signal applied blocks A1 to Ai, the driver IC 51 stores the computed value of the LCD noise in each block, and adds the stored computed noise values in the same manner. This can compute the LCD noises on the entire surface of the screen GS.

Next, the driver IC 51 transmits the added value of the LCD noises to the touch IC 52. The touch IC 52 detects the detection signal Vdet outputted from each of the touch detection electrodes TDL and extracts an LCD noise removed signal that is obtained by subtracting the added value sent by the driver IC 51 from each detection signal Vdet. This extracting process may be performed, for example, by the analog filter 42 that constitutes the touch IC 52, or alternatively, there may be provided a circuit, which performs the extracting process, upstream of the analog filter 42 illustrated in FIG. 1. The LCD noise removed signal has a signal waveform of only a disturbance noise because the waveform component of the LCD noise has been removed and the frequency component of those of the detection signal Vdet that appears along with the display drive signal Vcomd outputted from the drive electrode driver 14 has also been removed.

Then, the analog filter 42 passes therethrough only a frequency component of those of the disturbance noise on the LCD noise removed signal that has the same frequency as or a frequency in the vicinity of that of the touch detection drive signal Vcomt at the current point in time. The process onward is the same as that of the noise detection operation according to the first embodiment.

1-2C. Effects of the Second Embodiment

The aforementioned configuration and operation can provide the same effects as those of the first embodiment without the filtering function of the analog filter 42 according to the first embodiment. The filtering function prevents the passing of a frequency component of those of the LCD noise that has a noise level appearing as a peak. The filtering function also prevents the passing of a frequency component of those of the detection signal Vdet that is a signal frequency component on the touch detection electrodes TDL which appears along with the display drive signal Vcomd outputted from the drive electrode driver 14.

1-3. Modification

Figure 22:
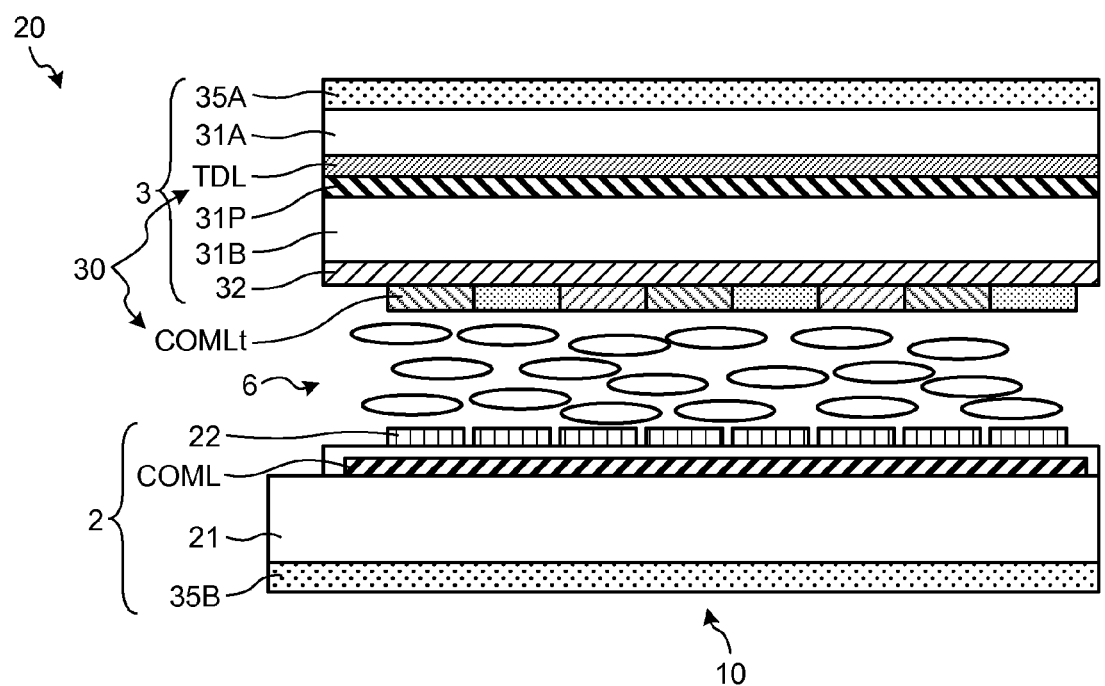
FIG. 22 is a cross-sectional view illustrating a schematic cross-sectional structure of a display device with a touch detection function according to a modification.

FIG. 22 is a cross-sectional view illustrating a schematic cross-sectional structure of a display device with a touch detection function according to a modification. In the modification, the aforementioned drive electrodes COML serve as a common drive electrode of the liquid crystal display device 20, while drive electrodes COMLt serve as a drive electrode of the touch detection device 30. That is, the embodiment does not share the common drive electrodes of the liquid crystal display device 20 and the drive electrodes of the touch detection device. Thus, in the display period in which the display operation is performed, the drive electrode driver 14 applies the drive signal Vcom as a display drive signal to the drive electrodes COML. On the other hand, in the touch detection period Pt in which the touch detection operation is performed, the drive electrode driver 14 applies the drive signal Vcom as a touch drive signal to the drive electrodes COMLt. In the display operation period Pd, the touch detection unit performs the noise detection operation to detect the disturbance noise superimposed on the touch detection electrodes.

The display unit 10 with a touch detection function includes the pixel substrate 2, the counter substrate 3 opposed to the pixel substrate 2 in a direction perpendicular to the surface thereof, and the liquid crystal layer 6 interposed between the pixel substrate 2 and the counter substrate 3. The counter substrate 3 has one surface of a glass substrate 31A and one surface of a glass substrate 31B joined together by an adhesive layer 31P. The color filter 32 is formed on the other surface of the glass substrate 31B. The plurality of drive electrodes COMLt are formed on the surface of the color filter 32. The touch detection electrodes TDL are formed on the one surface of the glass substrate 31A, with a polarizing plate 35A provided on the other surface of the glass substrate 31A. The glass substrate 31B and the glass substrate 31A are joined together by the adhesive layer 31P, thereby allowing the touch detection electrodes TDL to be sandwiched between the glass substrate 31B and the glass substrate 31A.

The pixel substrate 2 includes the TFT substrate 21 serving as a circuit board, a plurality of pixel electrodes 22 provided in a matrix on the TFT substrate 21, a plurality of drive electrodes COML formed between the TFT substrate 21 and the pixel electrodes 22, and an incident-side polarizing plate 35B on the lower surface of the TFT substrate 21. The touch detection electrodes TDL, the drive electrodes COML, and the drive electrodes COMLt may be disposed anywhere without being limited to the aforementioned configuration. For example, both the touch detection electrodes TDL and the drive electrodes COMLt may be disposed between the TFT substrate 21 and the substrate 31B, or the touch detection electrodes TDL and the drive electrodes COMLt may be disposed either on the glass the substrate 31B or on the glass substrate 31A (on the surface thereof toward the polarizing plate 35A).

While the embodiments have been described in accordance with several embodiments and modification, the present disclosure are not limited to these embodiments, but may be modified in a variety of ways.

2. APPLICATION EXAMPLES

Next, with reference to FIGS. 23 to 34, a description will be made to application examples of the display device 1 with a touch detection function that was described in accordance with the embodiments and the modifications. FIGS. 23 to 34 are views each illustrating an example of an electronic apparatus which incorporates the display device with a touch detection function according to an embodiment. The display devices 1 with a touch detection function according to the first and second embodiments and the modifications are applicable to an electronic apparatus of any field such as television devices, digital cameras, notebook personal computers, mobile terminal devices like a mobile telephone, or video cameras. In other words, the display devices with a touch detection function according to the first and second embodiments and the modifications can be applied to an electronic apparatus of any field that displays an externally supplied video signal or an internally generated video signal. The electronic apparatus includes a controller for executing processing based on the control detected by the display device with a touch detection function and supplying the video signal to the display device with a touch detection function.

Application Example 1

Figure 23:
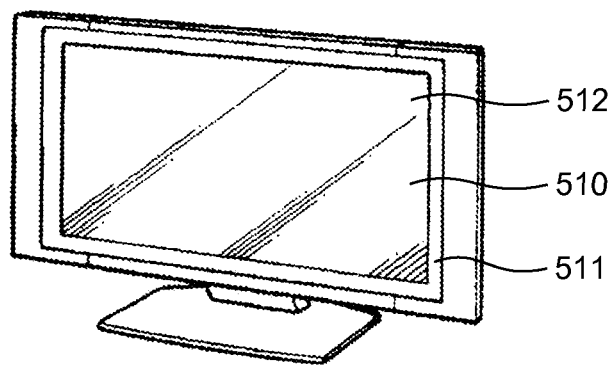
FIG. 23 is a view illustrating an example of an electronic apparatus which incorporates the display device with a touch detection function according to the embodiment.

The electronic apparatus illustrated in FIG. 23 is a television device to which the display devices with a touch detection function according to the first and second embodiments and the modifications can be applied. The television device has, for example, a video display screen 510 including a front panel 511 and a glass filter 512, the video display screen 510 being the display device with a touch detection function according to any of the first and second embodiments and the modifications.

Application Example 2

Figure 24:
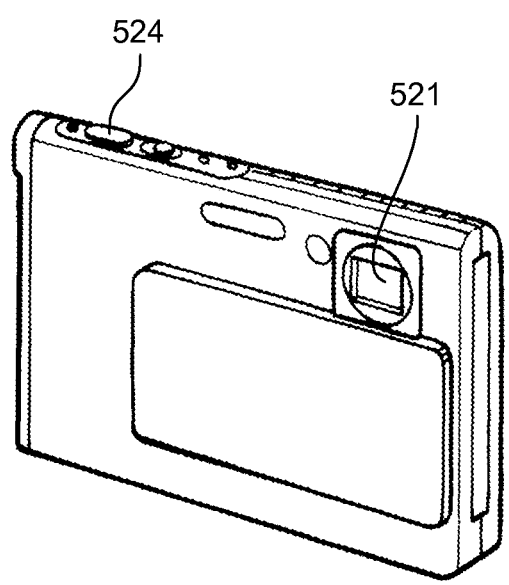
FIG. 24 is a view illustrating an example of an electronic apparatus which incorporates the display device with a touch detection function according to the embodiment.
Figure 25:
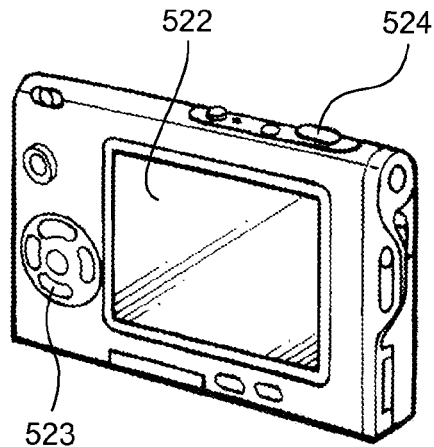
FIG. 25 is a view illustrating an example of an electronic apparatus which incorporates the display device with a touch detection function according to the embodiment.

The electronic apparatus illustrated in FIG. 24 and FIG. 25 is a digital camera to which the display devices with a touch detection function according to the first and second embodiments and the modifications can be applied. The digital camera has, for example, a flash light emitting part 521, a display section 522, a menu switch 523, and a shutter button 524, the display section 522 being the display device with a touch detection function according to any of the first and second embodiments and the modifications.

Application Example 3

Figure 26:
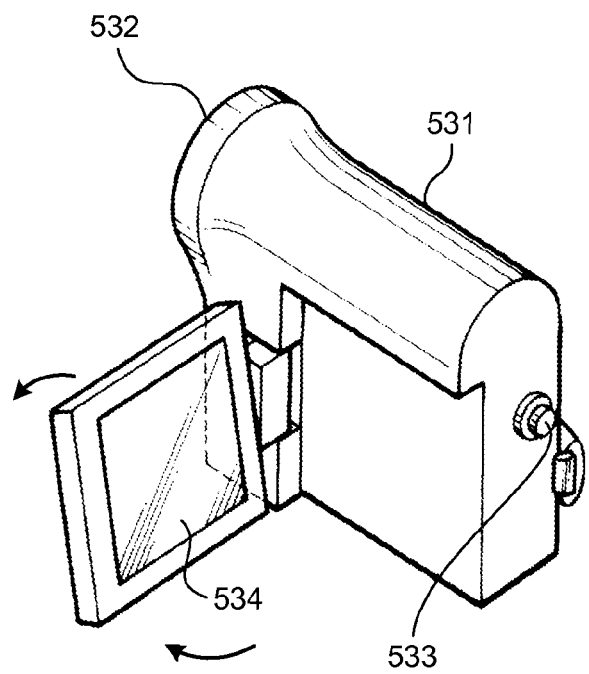
FIG. 26 is a view illustrating an example of an electronic apparatus which incorporates the display device with a touch detection function according to the embodiment.

The electronic apparatus illustrated in FIG. 26 has the outer appearance of a video camera to which the display devices with a touch detection function according to the first and second embodiments and the modifications can be applied. The video camera has, for example, a main body 531, a lens 532 provided on the front side of the main body 531 for capturing a subject image, a start/stop switch 533 for use at the time of capturing an image, and a display section 534. The display section 534 is the display device with a touch detection function according to any of the first and second embodiments and the modifications.

Application Example 4

Figure 27:
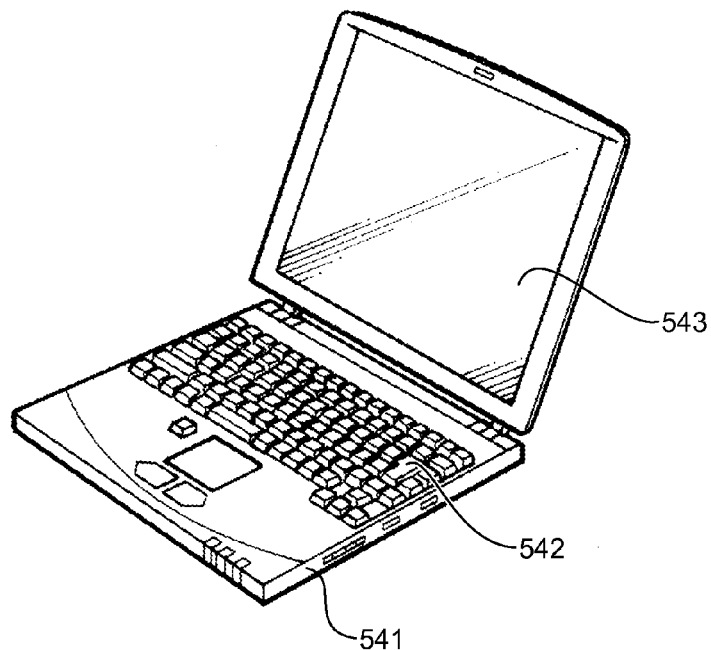
FIG. 27 is a view illustrating an example of an electronic apparatus which incorporates the display device with a touch detection function according to the embodiment.
Figure 28:
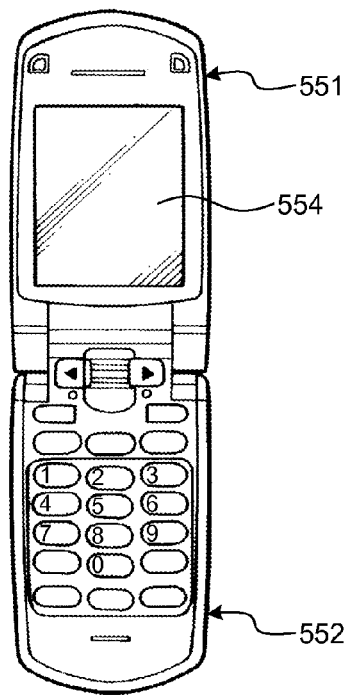
FIG. 28 is a view illustrating an example of an electronic apparatus which incorporates the display device with a touch detection function according to the embodiment.
Figure 29:
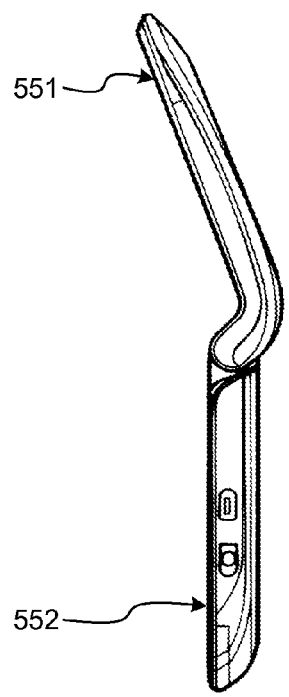
FIG. 29 is a view illustrating an example of an electronic apparatus which incorporates the display device with a touch detection function according to the embodiment.
Figure 30:
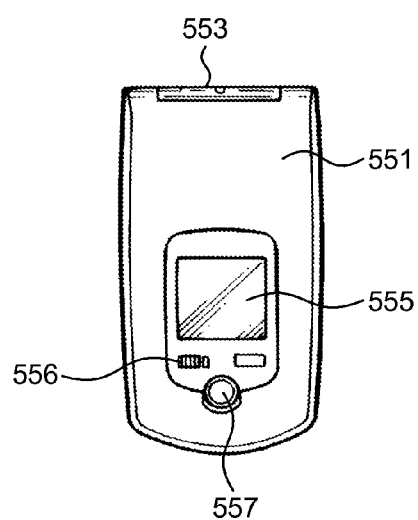
FIG. 30 is a view illustrating an example of an electronic apparatus which incorporates the display device with a touch detection function according to the embodiment.
Figure 31:
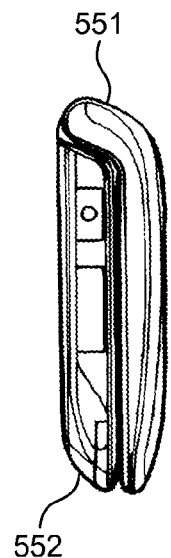
FIG. 31 is a view illustrating an example of an electronic apparatus which incorporates the display device with a touch detection function according to the embodiment.
Figure 32:
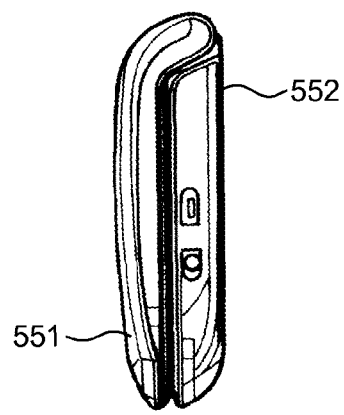
FIG. 32 is a view illustrating an example of an electronic apparatus which incorporates the display device with a touch detection function according to the embodiment.
Figure 33:
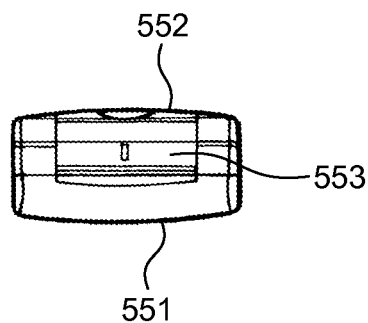
FIG. 33 is a view illustrating an example of an electronic apparatus which incorporates the display device with a touch detection function according to the embodiment.
Figure 34:
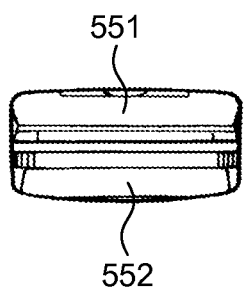
FIG. 34 is a view illustrating an example of an electronic apparatus which incorporates the display device with a touch detection function according to the embodiment.
Figure 35:
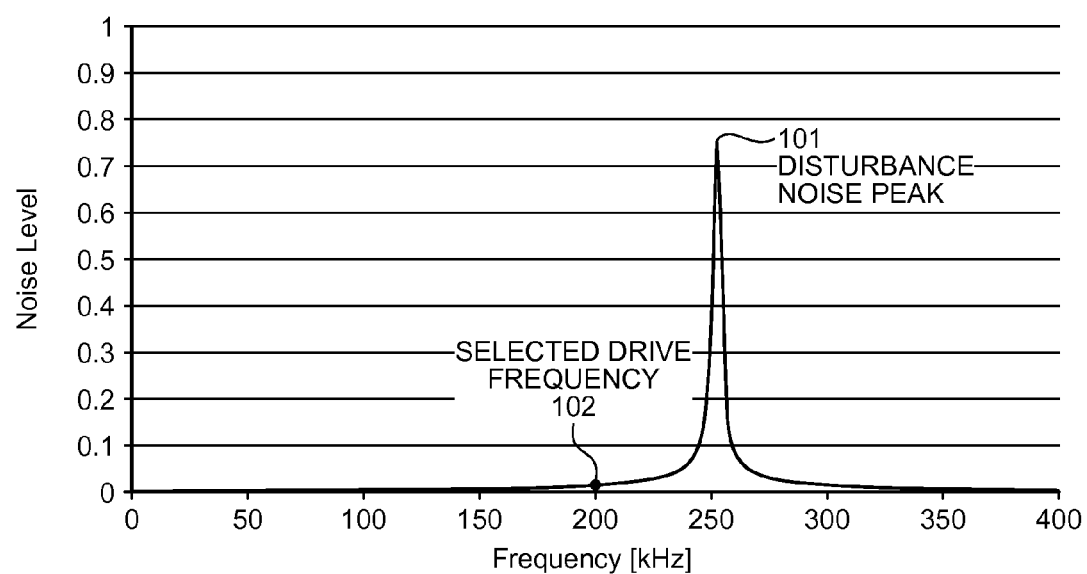
FIG. 35 is an explanatory view illustrating the relationship between the frequency of a touch detection drive signal and a disturbance noise.

The electronic apparatus illustrated in FIG. 27 is a notebook personal computer to which the display devices with a touch detection function according to the first and second embodiments and the modifications can be applied. The notebook personal computer has, for example, a main body 541, a keyboard 542 for input operation of characters or the like, and a display section 543 for displaying images, the display section 543 being made up of the display device with a touch detection function according to any of the first and second embodiments and the modifications.

Application Example 5

The electronic apparatus illustrated in FIG. 28 to FIG. 34 is a mobile telephone set to which the display device with a touch detection function according to the first and second embodiments and the modifications can be applied. The mobile telephone set has, for example, an upper casing 551 and a lower casing 552 coupled to each other by a coupling part (hinge) 553, a display 554, a sub-display 555, a picture light 556, and a camera 557. The display 554 or the sub-display 555 includes the display device with a touch detection function according to any of the first and second embodiments and the modifications.

3. ASPECTS OF THE PRESENT DISCLOSURE

The present disclosure includes aspects as follows.

(1) A display device with a touch detection function comprising:
a pixel electrode to which a pixel signal is applied to allow a display element to perform a display operation;
a touch detection electrode for detecting whether an external object is in contact with or in proximity to the display device;
a display drive unit for outputting the pixel signal to the pixel electrode in synchronization with a display drive signal so as to perform the display operation;
an operation drive unit for supplying the display drive signal in a display operation period to perform the display operation and supplying a touch detection drive signal in a touch detection period to perform a touch detection operation;
a touch detection unit for detecting a detection signal outputted from the touch detection electrode; and
a control unit for executing the display operation period and the touch detection period in a time divisional manner,
wherein the touch detection unit performs a noise detection operation for detecting a disturbance noise superimposed on the touch detection electrode in the display operation period.

(2) The display device with a touch detection function according to (1), further comprising a drive electrode to which the display drive signal is applied in the display operation and to which the touch detection drive signal is applied in the touch detection operation,
wherein the operation drive unit applies the display drive signal to the drive electrode in the display operation period, and applies the touch detection drive signal to the drive electrode in the touch detection period.

(3) The display device with a touch detection function according to (1), further comprising:
a first drive electrode to which the display drive signal is applied in the display operation; and
a second drive electrode to which the touch detection drive signal is applied in the touch detection operation, and
wherein the operation drive unit applies the display drive signal to the first drive electrode in the display operation period, and applies the touch detection drive signal to the second drive electrode in the touch detection period.

(4) The display device with a touch detection function according to (1), wherein the control unit executes alternately the display operation period and the touch detection period.

(5) The display device with a touch detection function according to (1), wherein in the noise detection operation, the touch detection unit is configured:
to remove, from the detection signal detected on the touch detection electrode, an LCD noise which is produced by the display operation performed by the display drive unit and the operation drive unit;
to have a filter function for passing only a frequency component of those of the detection signal having the same frequency as or a frequency in the vicinity of that of the touch detection drive signal at the current point in time and extract the frequency component by the filter function from the detection signal as a filtered frequency component;
to detect, based on the filtered frequency component, whether the disturbance noise has the frequency component that has the same frequency as or a frequency in the vicinity of that of the touch detection drive signal at the current point in time; and
to output a noise notice signal when the disturbance noise has a frequency component that has the same frequency as or a frequency in the vicinity of that of the touch detection drive signal at the current point in time.

(6) The display device with a touch detection function according to (5), wherein in the noise detection operation, the touch detection unit compares a signal level of the filtered frequency component extracted from the detection signal with a predetermined threshold value, thereby detecting whether the disturbance noise which has a frequency component having the same frequency as or a frequency in the vicinity of that of the touch detection drive signal at the current point in time is present.

(7) The display device with a touch detection function according to (5), wherein upon acquisition of the noise notice signal, the control unit changes the frequency of the touch detection drive signal to a different frequency.

(8) The display device with a touch detection function according to (1), wherein the touch detection drive signal has a frequency that is different from a frequency spectrum peak of the LCD noise.

(9) The display device with a touch detection function according to (1), wherein the touch detection drive signal has a frequency that is different from the frequency of the display drive signal.

(10) The display device with a touch detection function according to (1), wherein the touch detection unit detects the external object based on a change in capacitance between the touch detection electrode and the drive electrode caused by the external proximity object being brought into contact with or proximity to the device.

(11) The display device with a touch detection function according to (1), wherein the touch detection unit acquires an LCD noise determined by computation from the pixel signal.

(12) An electronic apparatus comprising:
the display device with a touch detection function according to (1); and
a controller for executing processing in response to a control operation detected by the display device with a touch detection function and supplying a video signal to the display device with a touch detection function.

The display device with a touch detection function according to the present disclosure and the electrical apparatus which includes the same perform the noise detection operation in the display operation period, thereby eliminating the need of providing a noise detection period separately from the display operation period and the touch detection period. This allows the time of the display operation period and the touch detection period to be extended, thereby allowing for maintaining the performance of the display operation and the touch detection operation. It is also possible to enhance the accuracy of touch detections by detecting disturbance noises. This makes it possible to improve the performance of writing images and detecting touches while detecting noises and thus improve the display performance and the touch detection performance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising: a pixel electrode to which a pixel signal is applied to allow a display element to perform a display operation; a touch detection electrode for detecting whether an external object is in contact with or in proximity to the display device; a display drive unit for outputting the pixel signal to the pixel electrode in synchronization with a display drive signal so as to perform the display operation; an drive electrode driver supplying the display drive signal in a display operation period to perform the display operation and supplying a touch detection drive signal in a touch detection period to perform a touch detection operation; a touch detection unit for detecting a detection signal outputted from the touch detection electrode; and a controller executing the display operation period and the touch detection period in a time divisional manner; wherein the touch detection unit performs a noise detection operation for detecting a disturbance noise superimposed on the touch detection electrode in the display operation period, wherein in the noise detection operation, the touch detection unit is configured to output a noise notice signal when the disturbance noise has a frequency component of a drive signal range that is limited to a same frequency of the touch detection drive signal and a frequency in a vicinity of the frequency of the touch detection drive signal at the current point in time, and wherein upon acquisition of the noise notice signal, the control unit changes the frequency of the touch detection drive signal to a different frequency.

2. The display device with a touch detection function according to claim 1, further comprising a drive electrode to which the display drive signal is applied in the display operation and to which the touch detection drive signal is applied in the touch detection operation,
wherein the operation drive unit applies the display drive signal to the drive electrode in the display operation period, and applies the touch detection drive signal to the drive electrode in the touch detection period.

3. The display device with a touch detection function according to claim 1, further comprising:
a first drive electrode to which the display drive signal is applied in the display operation; and
a second drive electrode to which the touch detection drive signal is applied in the touch detection operation, and
wherein the operation drive unit applies the display drive signal to the first drive electrode in the display operation period, and applies the touch detection drive signal to the second drive electrode in the touch detection period.

4. The display device with a touch detection function according to claim 1, wherein the control unit executes alternately the display operation period and the touch detection period.

5. The display device with a touch detection function according to claim 1, wherein in the noise detection operation, the touch detection unit is configured:
to remove, from the detection signal detected on the touch detection electrode, an LCD noise which is produced by the display operation performed by the display drive unit and the operation drive unit;
to have a filter function for passing only a frequency component of the drive signal range of the detection signal at the current point in time and extract the frequency component by the filter function from the detection signal as a filtered frequency component; and
to detect, based on the filtered frequency component, whether the disturbance noise has the frequency component of the drive signal range at the current point in time; and
to output the noise notice signal when the disturbance noise has a frequency component of the drive signal range at the current point in time.

6. The display device with a touch detection function according to claim 5, wherein in the noise detection operation, the touch detection unit compares a signal level of the filtered frequency component extracted from the detection signal with a predetermined threshold value, thereby detecting whether the disturbance noise which has a frequency component of the drive signal range.

7. The display device with a touch detection function according to claim 5, wherein the touch detection drive signal has a frequency that is different from a frequency spectrum peak of the LCD noise.

8. The display device with a touch detection function according to claim 1, wherein the touch detection drive signal has a frequency that is different from the frequency of the display drive signal.

9. The display device with a touch detection function according to claim 1, wherein the touch detection unit detects the external object based on a change in capacitance between the touch detection electrode and the drive electrode caused by the external proximity object being brought into contact with or proximity to the device.

10. The display device with a touch detection function according to claim 1, wherein the touch detection unit acquires an LCD noise determined by computation from the pixel signal.

11. An electronic apparatus comprising:
- the display device with a touch detection function according to claim 1; and
- a controller for executing processing in response to a control operation detected by the display device with a touch detection function and supplying a video signal to the display device with a touch detection function.

* * * * *